(12) United States Patent
Howard et al.

(10) Patent No.: US 6,768,994 B1
(45) Date of Patent: Jul. 27, 2004

(54) WEB BASED DATA MINING AND LOCATION DATA REPORTING AND SYSTEM

(75) Inventors: Craig Howard, Chandler, AZ (US); Robert J. Allen, Chandler, AZ (US)

(73) Assignee: Trimble Navigation Limited, Sunnyvale, CA (US)

( * ) Notice: Subject to any disclaimer, the term of this patent is extended or adjusted under 35 U.S.C. 154(b) by 507 days.

(21) Appl. No.: 09/792,635

(22) Filed: Feb. 23, 2001

(51) Int. Cl.[7] .............................................. G06F 17/30
(52) U.S. Cl. ................... 707/10; 707/104.1; 709/218; 709/246; 715/501.1; 715/513
(58) Field of Search ........................... 707/3, 5, 6, 10, 707/104.1; 709/217, 218, 200, 201, 246; 715/501.1, 513; 455/445

(56) References Cited

U.S. PATENT DOCUMENTS

| | | | |
|---|---|---|---|
| 5,777,580 A | | 7/1998 | Janky et al. |
| 5,802,492 A | | 9/1998 | DeLorme et al. |
| 5,832,496 A | * | 11/1998 | Anand et al. ............... 707/102 |
| 5,844,473 A | | 12/1998 | Kaman |
| 5,852,819 A | * | 12/1998 | Beller ........................... 707/1 |
| 5,870,746 A | * | 2/1999 | Knutson et al. ............ 707/101 |
| 5,918,010 A | | 6/1999 | Appleman et al. |
| 5,970,464 A | | 10/1999 | Apte et al. |
| 5,974,416 A | * | 10/1999 | Anand et al. ................. 707/10 |
| 5,978,787 A | * | 11/1999 | Wong et al. .................. 707/2 |
| 6,012,098 A | * | 1/2000 | Bayeh et al. ............... 709/217 |
| 6,055,541 A | | 4/2000 | Solecki et al. |
| 6,260,050 B1 | * | 7/2001 | Yost et al. ............... 715/501.1 |
| 6,560,456 B1 | * | 5/2003 | Lohtia et al. ............... 455/445 |
| 6,589,291 B1 | * | 7/2003 | Boag et al. ................. 715/513 |
| 6,606,596 B1 | * | 8/2003 | Zirngibl et al. ............. 704/270 |
| 6,609,148 B1 | * | 8/2003 | Salo et al. .................. 709/217 |

* cited by examiner

Primary Examiner—Shahid Alam
(74) Attorney, Agent, or Firm—Blank Rome LLP

(57) ABSTRACT

A database reporting and data mining system operates in one embodiment on a database of a location aware wireless gateway that processes message, location, event data obtained from an asset sensor or user, and other telemetry data from remote assets such as vehicles of a business enterprise fleet, and presents configurable reports on web pages displayed within the user's web browser in text or chart form. Reports, which may be user-customized, are created in response to user queries regarding, e.g., activity, and trends and summaries of activity for individual vehicles or an entire fleet. Database-stored event data grouped by relationship, e.g., start and end events, enable automatic computation of desired information such as time and distance between events. Report data in XML format are re-formatted in XSL stylesheets.

43 Claims, 24 Drawing Sheets

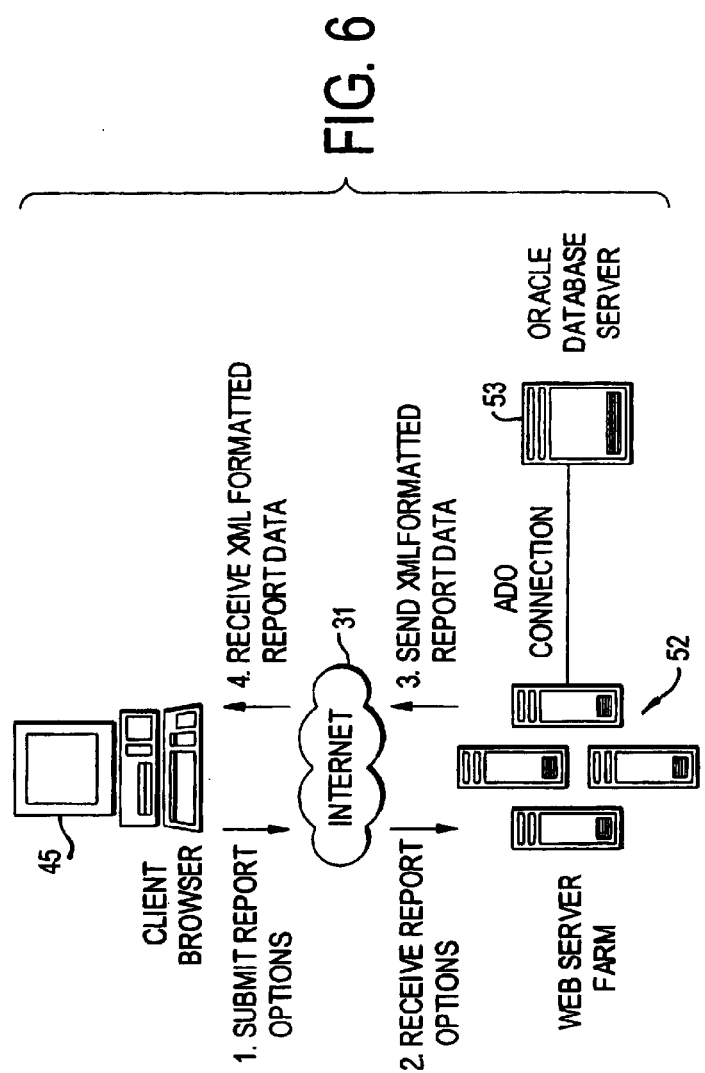
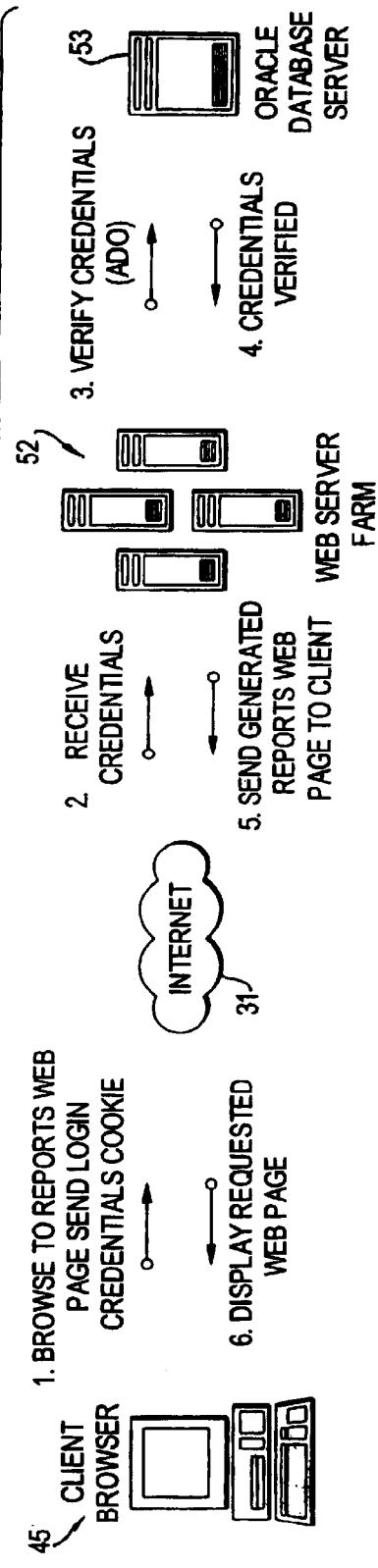
FIG. 6
FIG. 8

GET CHART INFORMATION

DISTRIBUTE EVENTS INTO GROUP OBJECTS

LOCATION MATCH

CREATE GROUP WITH
START AND END EVENT

GENERATE MISSING
START / END EVENT

CREATE VEHICLE
CHART XML

CREATE GROUPS

FIG. 14 PROCESSS THE "ALL" LIST

PROCESS THE StartEvent = All WITH EndEvent

PROCESS THE EndEvent = All WITH StartEvent

CREATE GROUP TOTALS

CREATE VEHICLE SUMMARY XML

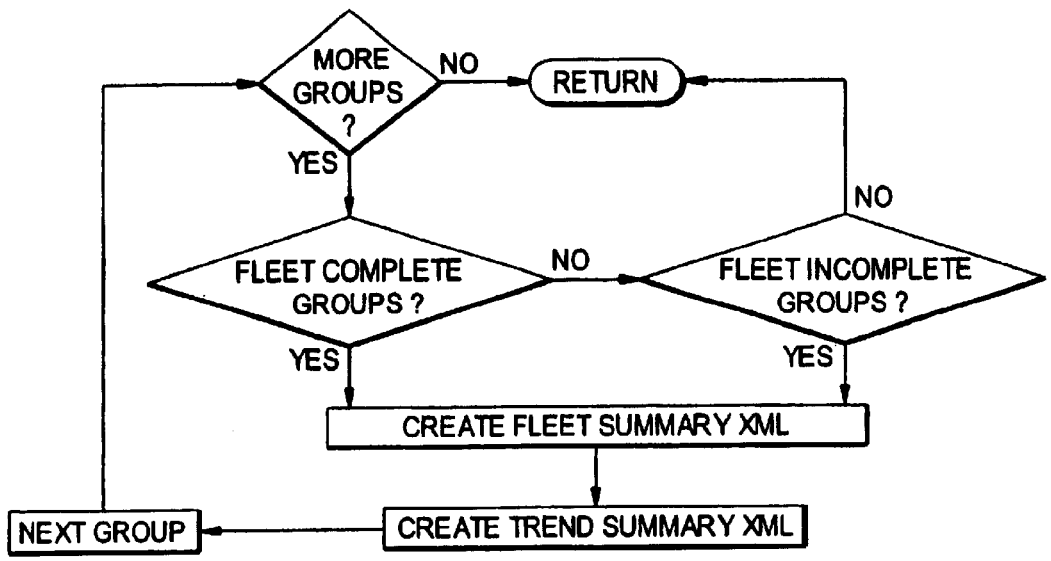
FIG. 22 CREATE FLEET SUMMARY AND TREND SUMMARY XML
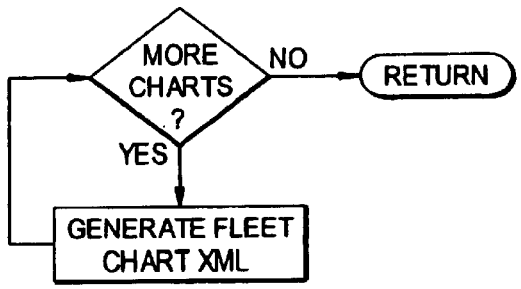
FIG. 23
CREATE FLEET SUMMARY CHART XML
FIG. 43
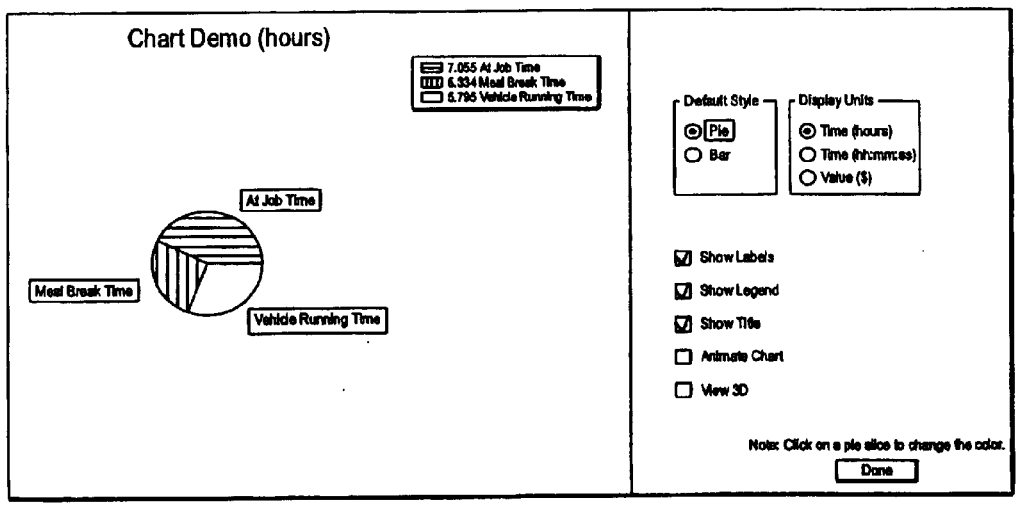

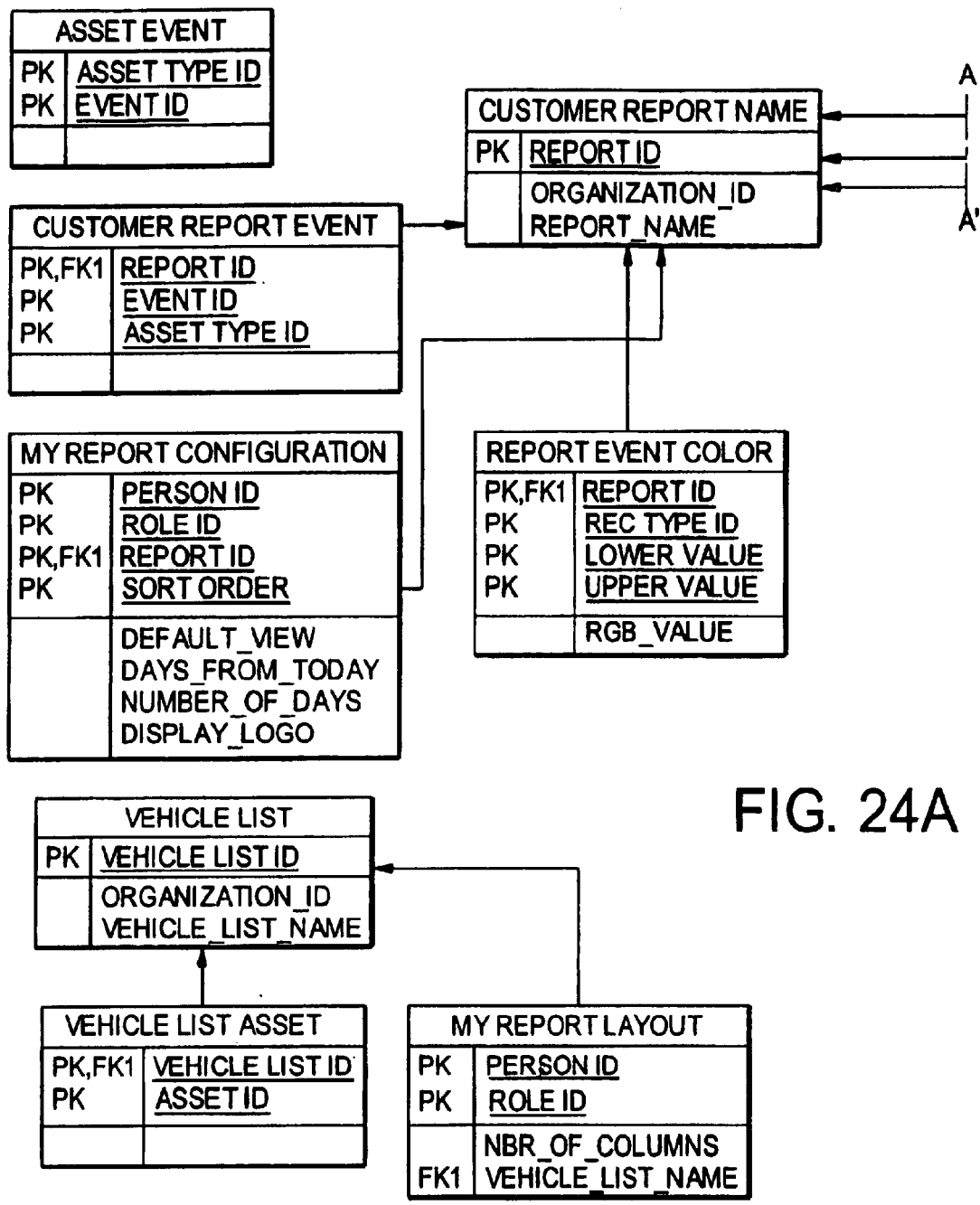

Report Options

Report: Event Report
Time Format: AM / PM
[New] [Edit] [Delete]

Vehicle List: All Vehicles
[View] [New] [Edit] [Delete]

Start Date: 11/1/2000
Start Time: 16:16:31
End Date: 11/2/2000
End Time: 16:16:31
Report Type: Event
[Generate Report]

FIG. 25

Event Report    From: 9/6/2000 To: 9/7/2000

Mountain Time (GMT - 7:00)    Vehicle Info    Home Site
Show Map    Job Site
Time Site

124

09/06/2000
05:10:06  Ignition is ON, Run Time Counter = 51 hours
05:17:17  Vehicle Started Moving
05:20:47  Depart Home Fiesta Yard
05:27:30  Speeding Started
05:36:18  Speeding Ended: Max Speed = 65 mph
05:36:53  Speeding Started
05:38:57  Speeding Ended: Max Speed = 65 mph
05:39:12  Speeding Started
05:44:03  Speeding Ended: Max Speed = 65 mph
06:05:50  Vehicle Stopped
06:11:38  Vehicle Started Moving
06:12:26  Vehicle Stopped

FIG. 26

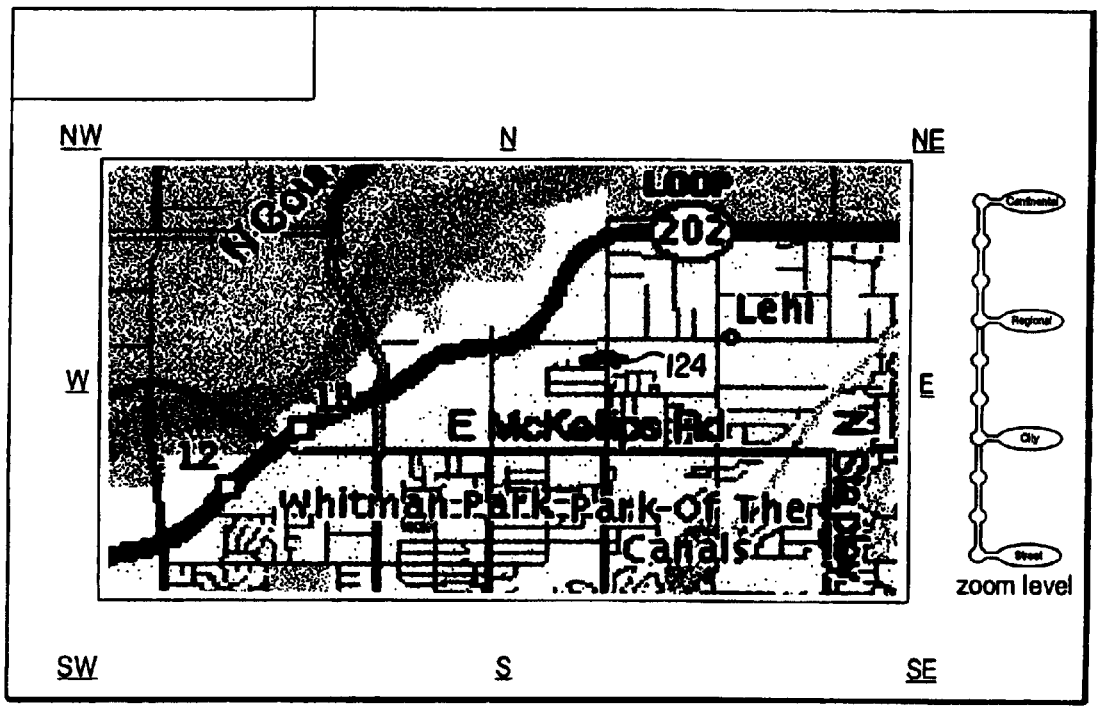

| | | | | | |
|---|---|---|---|---|---|
| Last Know Position | | | | From: 9/6/2000 To: 9/7/2000 | |
| | | | | Vehicle Info  Home Site | |
| | | | | Show Map  Job Site | |
| | | | | Time Site | |
| | 419 | 09/06/2000 | 20 : 35 : 38 | Ignition is OFF, Run Time Counter = 41 hours | |
| | 427 | 09/06/2000 | 15 : 57 : 02 | Ignition is OFF, Run Time Counter = 194 hours | |
| | 434 | 09/06/2000 | 13 : 23 : 22 | Ignition is OFF, Run Time Counter = 60 hours | |
| | 435 | 09/06/2000 | 20 : 21 : 09 | Ignition is OFF, Run Time Counter = 161 hours | |
| | 436 | 09/06/2000 | 15 : 41 : 18 | Ignition is OFF, Run Time Counter = 50 hours | |
| | 440 | 09/06/2000 | 14 : 16 : 24 | Ignition is OFF, Run Time Counter = 119 hours | |
| | 445 | 09/06/2000 | 14 : 44 : 28 | Ignition is OFF, Run Time Counter = 165 hours | |

End of Report

```
         09 : 03 : 05    Vehicle Running Time 00:37:50 Mileage = 10.4
         09 : 40 : 55    Ignition is OFF, Run Time Counter = 163 hours
         09 : 42 : 11    Ignition is ON, Run Time Counter = 163 hours
         09 : 42 : 11    Vehicle Running Time 00:11:02 Mileage = 0.0
         09 : 53 : 13    Ignition is OFF, Run Time Counter = 163 hours
         12 : 13 : 23    Ignition is ON, Run Time Counter = 163 hours
         12 : 13 : 23    Vehicle Running Time 00:28:59 Mileage = 9.4
         12 : 42 : 22    Ignition is OFF, Run Time Counter = 163 hours
         12 : 44 : 41    Ignition is ON, Run Time Counter = 163 hours
         12 : 44 : 41    Vehicle Running Time 00:16:26 Mileage = 4.1
         13 : 01 : 07    Ignition is OFF, Run Time Counter = 164 hours
         13 : 36 : 34    Ignition is ON, Run Time Counter = 164 hours
         13 : 36 : 34    Vehicle Running Time 01:07:54 Mileage = 36.4
         14 : 44 : 28    Ignition is OFF, Run Time Counter = 165 hours
Total Vehicle Running   03:43:43 Total Mileage = 91.7
Time
END OF REPORT
```

FIG. 33

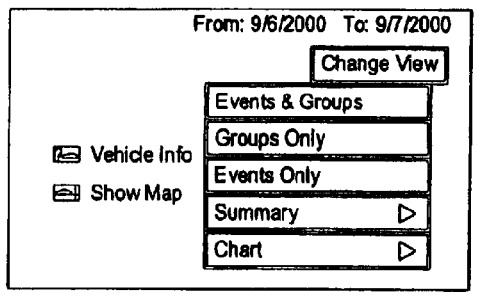

| Vehicle Summary | | | | | |
|---|---|---|---|---|---|
| 419 | Vehicle Running Time | | | | |
| | Vehicle Running Time Group Counts | | | Times | |
| Complete | Incomplete | Total | Total Vehicle Running Time | Average Vehicle Running Time | |
| 19 | 0 | 19 | 5.226 | 0.275 | |
| 427 | Vehicle Running Time | | | | |
| | Vehicle Running Time Group Counts | | | Times | |
| Complete | Incomplete | Total | Total Vehicle Running Time | Average Vehicle Running Time | |
| 12 | 0 | 12 | 1.885 | 0.148 | |
| 434 | Vehicle Running Time | | | | |
| | Vehicle Running Time Group Counts | | | Times | |
| Complete | Incomplete | Total | Total Vehicle Running Time | Average Vehicle Running Time | |
| 13 | 1 | 14 | 2.268 | 0.174 | |
| 435 | Vehicle Running Time | | | | |
| | Vehicle Running Time Group Counts | | | Times | |
| Complete | Incomplete | Total | Total Vehicle Running Time | Average Vehicle Running Time | |
| 11 | 0 | 11 | 5.361 | 0.483 | |

FIG. 39

My Report Layout

◉ 1 Column  [Finished]
○ 2 Column

My Reports [Add]

| Report Order | Edit | Report Name | Default View | Display Logo | Begin Report | # of Days | Delete |
|---|---|---|---|---|---|---|---|
| ▽△ | [Edit] | Test3 | Fleet Chart | Yes | 7 Days Ago | 7 Days | [Remove] |
| ▽△ | [Edit] | Event Report | N / A | Yes | Yesterday | 1 Day | [Remove] |

FIG. 40

Reporting - Mircosoft Internet Explorer

File  Edit  View  Favorites  Tools  Help

Back | Forward | Stop | Refresh | Home | Search | Favorites | History | Mail

Address [                                              ▽] Go  Links

| Reports | Mapping | Messaging | Work Order Mgt |
| Administration | Logout / Change Password |

Vehicle List Name:

[dump trucks]  [Save]

Phoenix Traffic Conditions

Griddata Homepage

☑ 124
☑ 130
☑ 131
☑ 137
☐ 139
☐ 140
☐ 142
☐ 143
☐ 144
☐ 349
☐ 350

Status | Connected | Message | Log in successful. Use menu to navigate | Time | 01/04/2001 13:59:26
Generate Report | | | Trusted sites

WEB BASED DATA MINING AND LOCATION DATA REPORTING AND SYSTEM

CROSS-REFERENCE TO RELATED APPLICATION

This application is related to U.S. patent application Ser. No. 09/659,850 of J. Coffee et al., filed Sep. 11, 2000 ("the '850 application"), assigned to the same assignee as that of the present application.

BACKGROUND OF THE INVENTION

1. Field of the Invention

The present invention is directed to the field of database report generation and data mining. It is specifically related to retrieval of data from a database over the Internet and presenting the results as web pages. The data to be retrieved primarily include historical reports for individual remote assets or vehicles and fleet summaries consisting of location and telemetry data from vehicles collected in real time through a wireless data network. Flexible database queries are generated and efficiently displayed in a web browser using ASP (Active Server Page), XML (Extensible Markup Language), XSL (Extensible Stylesheet Language) and COM (Component Object Model) technologies.

2. Brief Review of the Prior Art

Data processing systems in business enterprises are typically implemented in a three tiered client-server system, the tiers consisting of a database, business logic run on the server to access the database, and a presentation component to allow entry or display of the data. Widely distributed businesses often use the Internet to connect the client applications to the server. Browser based clients are only recently coming into use and typically provide less functionality to the end user than do full client applications. This is because most display processing and formatting occurs on the server, which slows the interface and restricts functionality.

Common examples of browser-based database access systems are Internet search engines such as Yahoo!™ (trademark of Yahoo!, Inc.) or on-line product catalogs or auctions such as eBay™ (trademark of eBay, Inc.). These systems provide the user with the ability to enter simple, Boolean database queries and return the search results in list form on a static HTML (Hypertext Markup Language) web page. The user cannot modify the view of the data. Additionally, these applications are consumer oriented and contain no specific business logic to apply to the database queries or report formatting. However, they may present additional information, such as advertising, to the user based on search terms included in the query.

An automatic report generating system disclosed by Solecki in U.S. Pat. No. 6,055,541 uses ASP (Active Server Pages), a web server scripting technology, to create H reports that are then displayed in the browser. The system generates engineering reports from a database of parameters of parts from a computer aided design application. The ASP script launches the code necessary to retrieve data from the database and format an HTML page according to a predefined format. If the user desires any change to the report format, a new report must be generated by the server.

Data mining is the process of examining a large database of information to identify trends in particular parameters or to discover new relationships between parameters. Apte discloses in U.S. Pat. No. 5,970,464 a client-server based system for mining insurance data to analyze underwriting profitability. A web based data mining system is disclosed by Appleman in U.S. Pat. No. 5,918,010. This system creates HTML based web pages by accessing information from multiple web pages to combine relevant data onto a single page.

While there are many systems for retrieving data from remote vehicles, there is no mention of database reporting systems to extract those data for reporting business related information. In U.S. Pat. No. 5,844,473, Kaman describes a system for collecting usage data, such as mileage, from vehicles and storing the data in a central computer for later use in determining vehicle maintenance schedules. However, the system does not seem to provide detailed reports on vehicle location or activity related to the business in which those vehicle operate. In U.S. Pat. No. 5,777,580, Janky references numerous systems for obtaining location and telemetry data from remote vehicles and assets over wireless networks.

Travel and route planning is a field that is the counterpart to historical reporting of vehicle location and telemetry data. DeLorme, in U.S. Pat. No. 5,802,492, describes a stand-alone travel planning application that identifies the locations of points of interest and events or activities to be performed at those points of interest. The application provides the user with a list of locations to be visited and multimedia presentations related to those locations. It does provide for the loading of an actual travel route into the application for use in creating new travel plans.

Many businesses operate fleets of vehicles, have a mobile workforce, have remote fixed assets, or rent mobile equipment. Managing these assets or employees efficiently is a difficult task. Getting data from these assets that indicates what they are doing and where and when they are doing it into applications that managers use to run their businesses is of critical importance.

In the aforementioned '850 application, Coffee et. al. disclose a Location Aware Wireless Gateway that is a platform for providing location and telemetry data from remote assets to business end users and applications. Applications and data are provided to customers over the Internet from the network operations center. Text messaging and mapping are provided as core functions. Standard protocol interfaces are provided to the core location business logic and database as well as the mapping and messaging to enable other business applications to use the wireless networks and location information. One example of location aware business logic is the ability to send a location of interest to a mobile device. The mobile device then can automatically report when it has arrived or left the location. The ability to send locations and receive status is extended to any application, such as dispatching, to enable it to track work order status. Interfaces to mapping functions allow the application to view and define locations of interest.

The Gateway stores asset telemetry and location data in a large database for later reporting or playback. Businesses require detailed reports on vehicle and asset activities to settle disputes, provide data for cost determination and billing, and to evaluate asset utilization. With a large enough body of data, businesses can perform data mining functions to determine trends in vehicle trip times or distances, costs of and revenues generated by assets, and other information to enhance business decision making. The Internet and standard browser software allow the business user to access data at any time from almost anywhere. The subject of the present invention is a customizable, web based, reporting and data mining system that provides these benefits to business owners with vehicle fleets and remote personnel or assets.

SUMMARY OF THE INVENTION

The database reporting and data mining system that is the subject of this invention is implemented, in one of its aspects, as part of a Location Aware Wireless Gateway. The Gateway provides a standard platform for providing location and telemetry data through wireless connections from remote assets to business end users and applications. Applications and data are provided to customers over the Internet from the network operations center. The Gateway provides inherent text messaging and mapping applications. Telemetry data, location data, and message text are stored in the database within the Gateway. The database reporting system is provided as a mechanism to analyze the past activity of a business's assets or vehicles.

Remote assets are connected to the Gateway through wireless data networks; data reported by the assets are stored in the Gateway database and forwarded in real time through the Internet to any business users who are owners of those assets. Assets may be vehicles, remote equipment, or personnel. Assets report periodic location related information (position, speed, direction of travel, etc.) as well as other telemetry information as required. Telemetry data include events related to changes in sensor inputs, such as a door opening or ignition turning on, and other navigation related events, such as stops, or arrivals at and departures from specific sites of interest. The location aware business logic residing in the Gateway and the remote assets, tags events with location information. The location information is both a set of coordinates and a work site identifier that indicates where an event took place. Work sites identify the locations of jobs or other points of interest and are part of the SITE DISPATCH™ (trademark of Grid Data, Inc., assignee of this application) business logic in the Gateway.

The reporting system presents the user with a web based interface to the Gateway database. The system produces event reports for each of the user's assets. Event reports are simply time and location tagged lists of telemetry events reported by the asset. The user is able to configure custom reports to logically group events of interest to the user. The user may be interested in time and distance between particular locations or time vehicles spend idling versus moving. Arrival and departure events or moving and stopping indications are set as the appropriate start and end events for a group, and the report configuration is stored. The new report, when executed, will extract the times, and distance when appropriate, between the start and end events and presents those in list or chart form. Multiple groups can be presented in a single report, and the report can be run across multiple vehicles or long time periods to examine trends.

The invention uses a variety of Internet and database technologies to make web based reporting and data mining possible. These technologies include ASP, XML and XSL, DHTML (Dynamic Hypertext Markup Language), COM, and ADO (ActiveX Data Objects).

Active Server Pages are processed on the server and allow the server to create HTML pages dynamically. This allows the report generator to vary report parameters to create many reports using a small set of pages and gives the pages direct access to the database through ADO. ADO are a standard protocol for accessing data in a database. Using this technology, the system is able to access any database that supports ADO, including Oracle™ (trademark of Oracle Corporation) and Microsoft™ (trademark of Microsoft Corporation) SQL Server. In the preferred embodiment of the invention an Oracle database is used to store all event data for which reports are to be generated. Stored Procedures and Oracle's PL-SQL language allow for fast, powerful queries of the report data. This database also has a partitioning capability which allows data to be partitioned by date, customer or other parameter; this, in turn, allows for faster queries of data tables because a smaller portion of the database may be searched for many queries.

COM is used to create distributed and concurrent systems for modern Microsoft™ operating systems. The report COM components apply business logic to the report parameters and call the appropriate database stored procedures to get a recordset from the database. The recordset is then converted by the COM components and returned to the calling web page in XML format. Each web server has a copy of the report COM components which query the database. This provides redundancy in the web server implementation by allowing users to connect to and use any available web server for generating reports even if one or more are offline. It also allows for load balancing, so the web servers are distributing the report generation workload.

XML is a powerful, easy to use method to transfer data between web pages, and report data is provided to the client browser in XML format. The presentation of XML on the screen is controlled by the use of XSL. It is used to modify the presentation of the XML data without having to access the web server. For example, the user can change from a text based report to a graphical chart of the same data. The reports are shown on web pages with DHTML content. Dynamic HTML embeds code in a normal static HTML page to provide the user a richer experience when selecting, configuring and interacting with the report. Once a report is generated, the user can interact with the report to get more detailed information or a different view of the report.

The present invention has several attendant advantages and features for the business user, including providing the user with a sophisticated data mining capability.

One advantage is Active Report Pages. When the user generates an event report, each event has icons beside it which allow for further interaction with the report. For example, the user may be looking at a "Speeding Started" event on the report. If the interest is in seeing where the asset was located when the "Speeding Started" occurred, the user simply clicks on the map icon beside the event, which triggers the generation of a map showing the vehicle's location at the time the event occurred. As another example, if the report page shows that an employee of the user is located at one of the defined sites of interest, the user can identify that location by simply moving the mouse over the site icon and the name of the site is displayed as a tooltip.

Another advantage is that queries are generated based on events. Each type of event that can occur has a unique ID number. When the user is interested in a subset of events, he can create a custom report in which the user selects the events to be included in the report. This allows for very quick database queries of the desired data and fast parsing of that data. The COM component that converts the database recordset to XML does not have to parse through every event and discard the unused events.

Still another advantage is that the invention supports different types of events based on asset types defined in the database. Business owners typically have different types of assets about which they need information. The events that are triggered by one asset type do not always match the events that are triggered by another asset type. The report generator allows selection of events that are only relevant to the desired asset types. For example, if a business has concrete trucks and dump trucks, it can track when the concrete trucks pour cement and when the dump trucks unload material in the same report. The report generator only displays the events relative to each asset type when the report is created by the user.

Yet another advantage of the invention is that events in reports can be grouped, and time durations and distances of business importance are automatically calculated. A group can be created with any two events; a start event and an end event. A group provides the user with time and mileage between events, where the assets of interest are vehicles. The group totals can then be summed for a vehicle and across the entire fleet of vehicles, providing the user with valuable business information. The grouping feature gives the user the ability to customize reports to fit his business needs. Group types allow the user to report on all groups, the first group of the selected time range, or the last group of the selected time range. Event types allow the user to use all events, the first or the last event only. For example, the user could define a group called "Hours Worked" and select the start event as "First—Ignition On" and the end event as "Last—Ignition Off". Time offsets enable the user to adjust the group total time by a specified amount of time. Expanding on the previous example, the user could have the report generator add 15 minutes to Total Hours Worked for each employee. Group Values allow the user to multiply the group total time by an associated value such as a dollar amount.

Another advantage of the invention is that reports can be reformatted and customized using XSL stylesheets. With XSL, the user can see the full report, hide pieces of information, switch between different views of the data such as text and charts, all without returning to the server for more information. As long as the data stay the same, stylesheets allow the user to reformat the display of that information on their computer. Further customization of the reports is available through a "My Reports" configuration. After the user has customized the reports for his business needs, a set of reports can be created with one mouse click. The user can select the default view, display of the company logo, and the relative date/time range for which to run the report. Each report in the set has its own set of parameters. The user can also select the number of columns in which to display the set of reports.

Still another advantage is that the invention provides data mining functions that compute summaries and trends of data. Fleet summaries and trend reporting allow the user to see the data as an aggregate of all the vehicles in is fleet. Business costs, averages, cycle times, trends, efficiency and productivity can be determined. The discrete events which occur in daily activities of the vehicles are translated into valuable information to aid business decisions.

The gateway is only one example of a data source for the invention, the gateway also providing security. It should be understood, then, that the reporting system and method of the invention with groups and web/XML/XSL features can be used in any application that requires web distributed access to the reports. The invention is especially useful in applications that can make use of groups, e.g., process control or manufacturing where items or workers spend time at different stations on certain tasks (location and time component). Events such as "start welding" and "end welding", or "start painting" and "end painting" can go into a database that uses the system for statistical process control, and so forth. Key features of the invention include XML/XSL; groups→summaries, trends, charts; and active report pages.

A web-based database method is used for reporting performance data in carrying out a web-served application of a business enterprise to business enterprise users on web browsers through multiple wireless networks and the Internet. Business logic is used to receive data related to actual and projected performance of the application as detected or determined by one or more performance sensors at locations where the application is being performed. The data is used to tag events of interest toward an assessment of performance, and the tagged events are stored in a database for retrieval thereof in real time through the Internet by the respective business enterprise users. Web servers responsible for performing reporting functions are integrated into a wireless network for access to the web. Groups of database-stored events related by event type are established, and data derived therefrom is reported from the web servers in XML to the web browsers in response to queries from users. The reported XML data may be re-formatted in XSL through the web browser for viewing on a web page.

BRIEF DESCRIPTION OF THE DRAWINGS

The above and still further objectives, aims, features, aspects and attendant advantages of the present invention will become apparent from a consideration of the following detailed description of the best mode presently contemplated for practicing the invention, with reference to certain preferred embodiments and methods, in conjunction with the accompanying drawings, in which:

FIG. 6 is a high-level sequence diagram illustrating generation of a report from the request, to the data returned to the browser;

FIG. 8 is a sequence diagram for credential cookie retrieval and verification by the server;

FIG. 22 is a flow chart for generating fleet summary and trend summary XML;

FIG. 23 is a flow chart for generating the fleet summary chart XML;

FIG. 24 illustrates the relationship between tables in the database used for reporting;

FIG. 25 shows the user interface for report selection and generation;

FIG. 26 shows an example of typical standard event report;

FIG. 27 illustrates the map presented when the map icon is selected on the report options screen;

FIG. 29 illustrates the detail including tool tip identification of the work site brought up by placing the mouse over a work site icon on the report options screen;

FIG. 30 illustrates an example of a last known location report concerning the vehicle;

FIG. 33 illustrates an example of a combined event and group report;

FIG. 34 illustrates a user interface that enables changing the report format between events only, groups only, events and groups, and fleet and vehicle summaries;

FIG. 35 illustrates a vehicle summary report for an exemplary running time:group;

FIG. 39 illustrates a configuration screen for My Reports;

FIG. 40 illustrates a user interface for editing and creating vehicle lists;

FIG. 41 illustrates a report name entry user interface;

FIG. 42 illustrates a user interface for advanced group configuration options; and FIG. 43 illustrates an advanced chart configuration user interface.

DETAILED DESCRIPTION OF THE PRESENTLY CONTEMPLATED BEST MODE

A. Location Aware Wireless Gateway Platform

The database report generation and data mining system (referred to briefly herein from time to time as the "reporting system") to be described herein is connected, by way of example and not of limitation, to the location aware wireless gateway of the aforementioned '850 application (sometimes referred to herein simply as "the Gateway"). Accordingly, while the reader is referred to the '850 application in full, which is incorporated herein by reference, an initial brief description of the Gateway is provided at this point as a convenience to the reader by way of background and a frame of reference for the description of the reporting system.

The Gateway is an interface for providing remote asset location and telemetry data to business enterprise users. It functions in this way by applying standard business logic and interfaces to a variety of wireless networks, and is a platform on which web served applications that make use of the data acquired by the Gateway, such as those shown as basic and add-on in FIG. 1, can be built through an Application Program Interface (API) 15.

Figure 1:
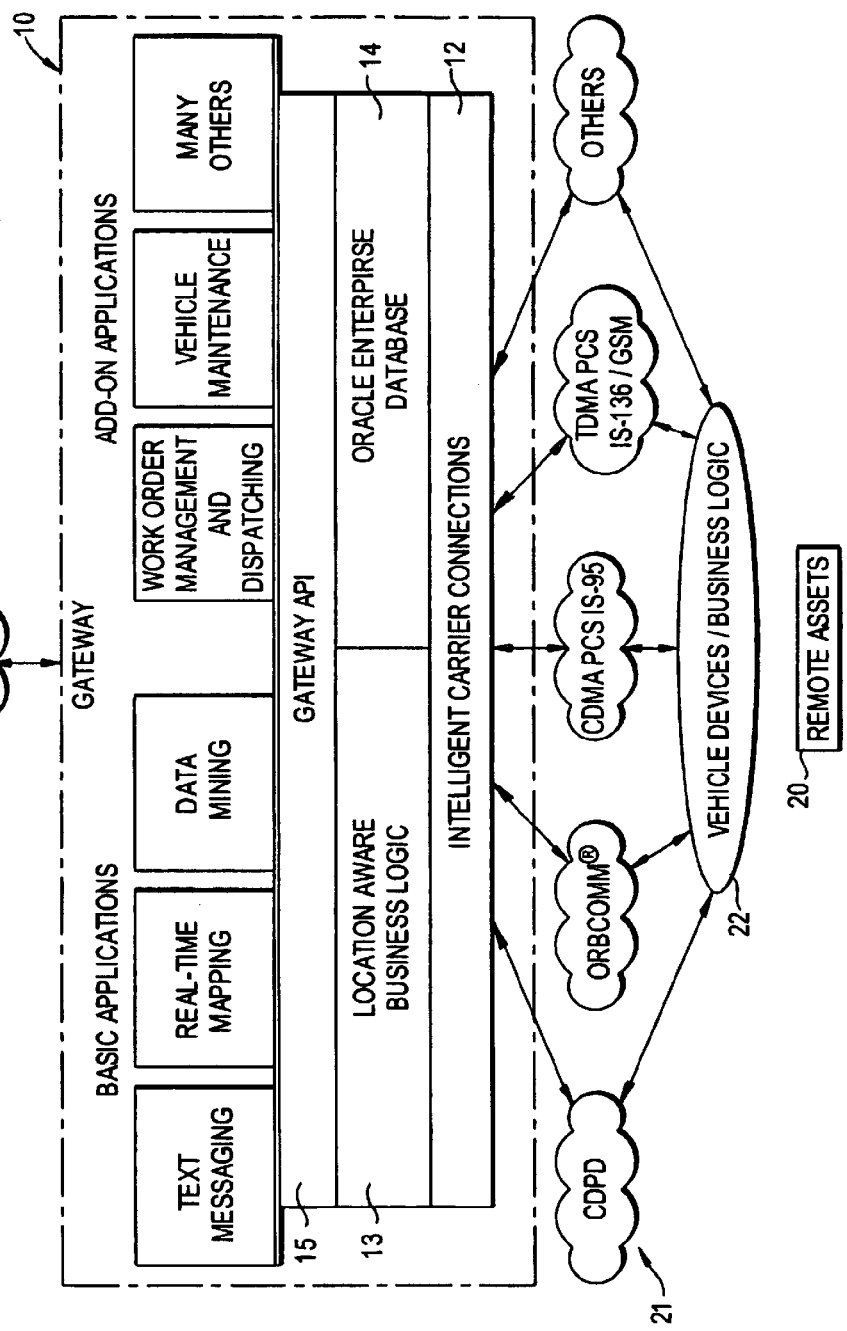
FIG. 1 is a top-level diagram illustrating connection of applications to the Gateway platform.

Referring more fully to the high level view of the Gateway 10 illustrated in the diagram of FIG. 1, its core is composed of four components, viz.: intelligent carrier connections 12, location aware business logic 13, an Oracle (trademark of Oracle Corporation) 8i Enterprise database 14, and API 15.

A wireless interface between an enterprise among the business enterprise end users 17 and their respective remote assets 20, such as work-related vehicles, for example, is required to transmit messages, location data, and other information between them. Gateway 10 provides wireless connectivity to the remote assets 20 through a variety of wireless data carriers and protocols 21. In a current embodiment, the Gateway supports full text message and location data communication with vehicle mounted and handheld devices 22 through CDPD (Cellular Digital Packet Data) and other wireless transport protocols. In addition, it supports messaging and other application specific user interfaces using Wireless Application Protocol (WAP), which is available presently on several wireless data networks.

The location aware business logic 13 within Gateway 10, coupled with additional logic in location enabled wireless devices among devices 22, provides location related services through API 15. Since most pieces of business information can have a location related component, the business logic associates a location with events reported by the remote assets. It also implements a SITE DISPATCH™ component of the business logic, which provides automated notification of vehicle arrival at and departure from specified locations to the respective business enterprise end user 17. The vehicle (or hand held) devices periodically report the remote asset's location, and location based events such as the vehicle's excessive idleness or excessive speed. Additionally, the business logic 13 manages security for customer accounts and data access.

All data processed by Gateway 10 are stored in the enterprise database 14. The database is hosted on a large Storage Area Network (SAN) system, and is accessed using an Oracle™ Parallel Server to support substantial scalability in capacity and throughput. The database is accessible through API 15 using the location aware business logic 13. Applications can make flexible queries for information; these may include asset location data for playback and other event data.

API 15, which is based on an Extensible Markup Language (XML) interface, enables any type of application to be easily integrated with the Gateway to take advantage of the latter's communication and location aware capabilities. Through the location aware business logic, this provides a standardized protocol for communication with the database and remote assets. Both web served and client server model applications are supported by the API.

Figure 2:
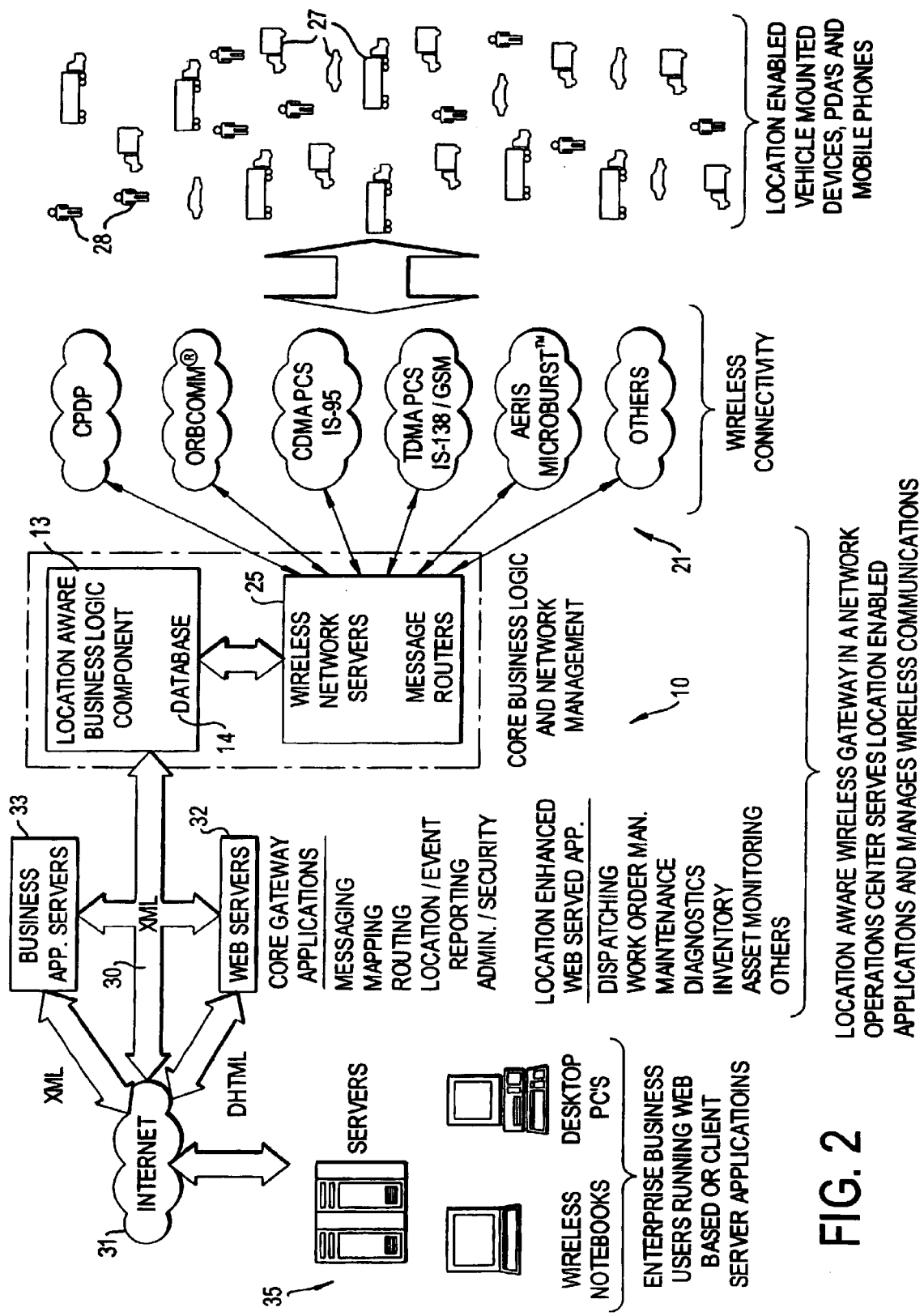
FIG. 2 is a diagram illustrating data flow between the business enterprise user and remote assets through the Internet, location aware business logic, and wireless networks.

The protocols and data flow through the Gateway 10, which is located in a network control center or operations center, are illustrated in FIG. 2. The carrier connections are implemented on servers 25 responsible for routing messages to the appropriate wireless network 21 and implementing the protocols required by each of those networks. Location enabled wireless devices in vehicles 27 and carried by people 28 communicate location and other data over the appropriate network with the Gateway. Received data are stored in the database 14 and passed to the appropriate customer connections and applications using the location aware business logic 13.

Applications that are connected to the Gateway normally connect using an XML interface 30. Applications reside in the same physical location as the Gateway hardware or at some other point on the Internet 31, either at an end user's site or at the application provider's site. Web served applications usually run on a combination of web servers 32 and back-end application or database servers 33 depending on their complexity. Applications that reside at the Gateway are able to take advantage of more direct access to the database and business logic, allowing those applications to be more powerful than remotely hosted applications. Business end users access the applications and data through the Internet 31 using a variety of PCs 35 with web browsers or dedicated applications.

B. Reporting System Integration to the Gateway

Figure 3:
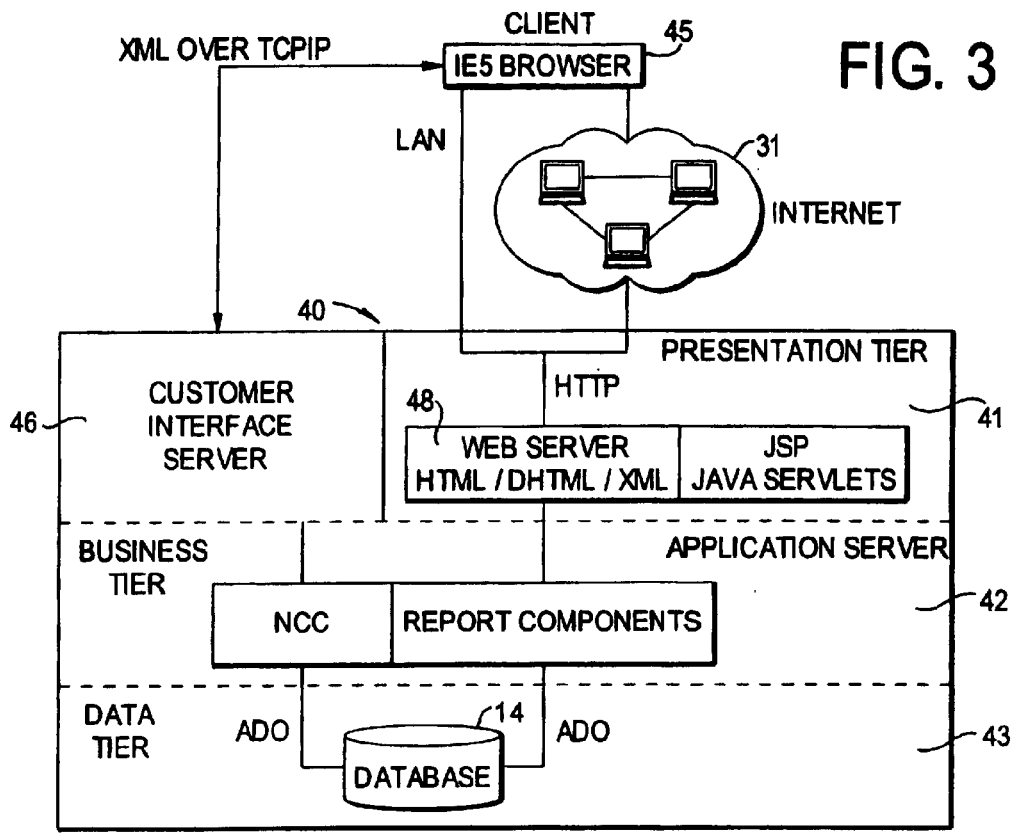
FIG. 3 is a diagram of the reporting system integration with Gateway components.

The web servers responsible for performing the reporting functions are integrated into the Gateway 10 as shown in FIG. 3. The Figure represents the reporting system 40 in a traditional client-server three tier architecture of presentation 41, business logic 42, and data 43. The client browser 45 normally connects to the Gateway Customer Interface Server (CIS) 46 using an XML based protocol. This interface provides real time data transfer of asset locations and messages along with other application data. For reporting, the client browser 45 connects directly to web servers 48 running the reporting application through the Internet 31 or any IP (Internet Protocol) based interface using HTTP (Hypertext Transfer Protocol).

Server side components of the reporting system reside in the Business Tier 42 along with the other business logic and wireless network interface components of the Gateway (FIGS. 1, 2). The business logic and report components access the database 14 via Microsoft Active Data Objects (ADO). As an integral part of the Gateway, the reporting system is able to directly access the database. Other applications that are added to the Gateway's integration platform access the database through XML based requests via CIS 46 and business logic.

C. Reporting System

A detailed description of the reporting system is presented below, including the system hardware and software components, the steps performed by the system to create and generate reports, and a description of the user interface.

1. System Components

Figure 4:
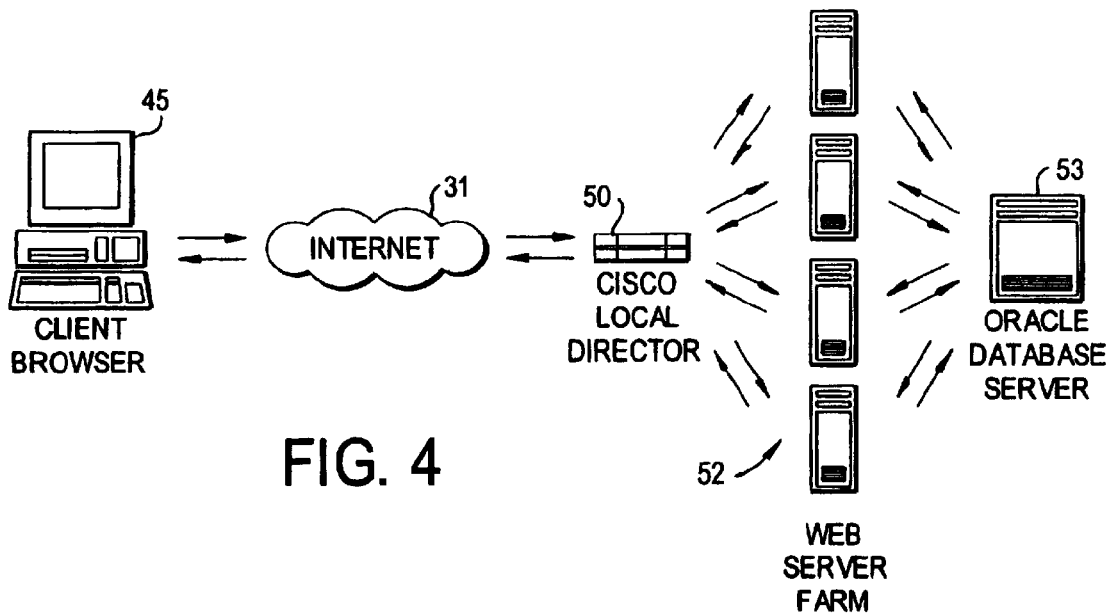
FIG. 4 is a diagram illustrating the hardware components of the reporting system.

FIG. 4 is a diagram of the hardware system for the web served reporting application. The client browser 45 is Microsoft Internet Explorer™ version 5.0 (IE5), for example, or higher running on a Windows™ platform. The client can connect to the Internet 31 by any conventional means. When the client browses to the IP address for the Gateway, an internal Cisco™ Local Director 50 determines which web server in the web server farm 52 will service the request. A number of load balancing schemes are available; one is round robin, where requests are sent in sequence to each available server. The web server runs on Windows 2000™ and Internet Information Server 5.0 (IIS). The connection to Oracle™ database server 53 is ADO over TCP/IP, in which the ADO connection is a two way interface between the web server and the Oraclem version 8i database. The return record sent back from the database is directed to the same web server that made the request. The web server then generates the appropriate report, and sends HTML, DHTML, XML, and XSL back to the client for processing and display.

Figure 5:
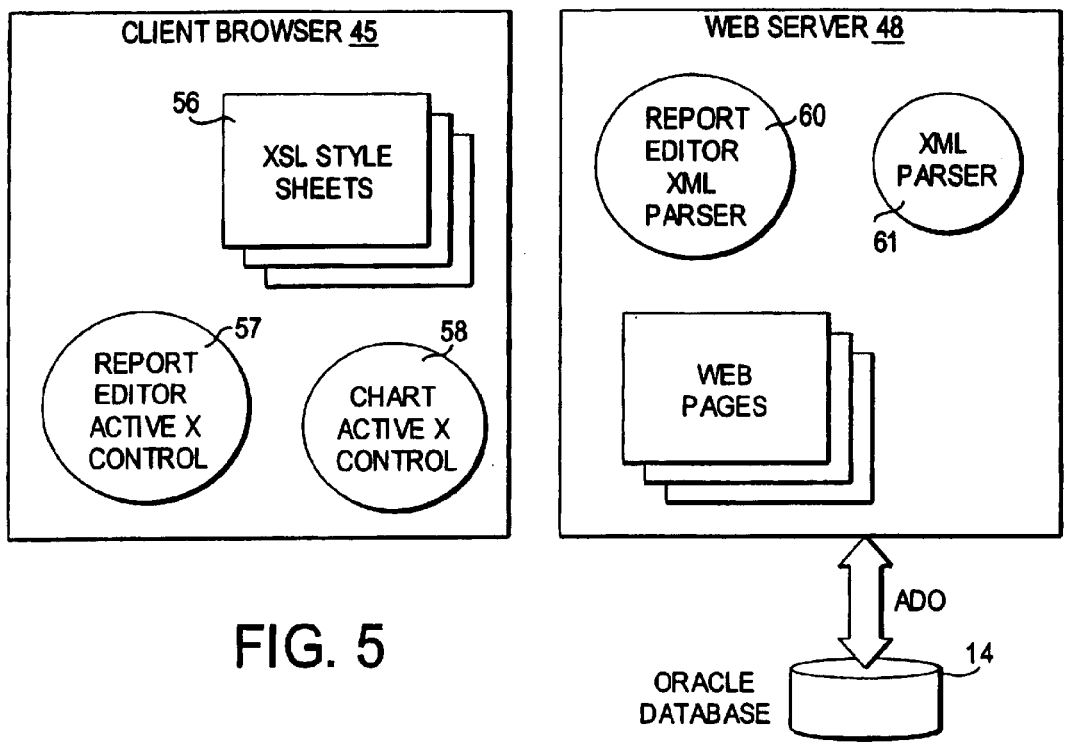
FIG. 5 is a diagram illustrating the software components of the reporting system.

FIG. 5 is a diagram illustrating the software for the reporting system. The client machine 45 is used to process style sheets 56 for XML display and to run ActiveX controls 57, 58 to control display of data. The ActiveX controls are updated on the client when either the ActiveX control is not present on the client, or a newer version of the control is available on the web server 48. The controls are persistent on the client machine 45 between sessions. XSL stylesheets 56, which control the display of the XML data, are memory resident only. Each action of generating a report with different parameters causes XSL stylesheets and a new set of XML data to be sent to the client browser 45.

The Report Editor ActiveX control 57 is used for easy modification of the report configuration on the client. Pre-filled with all the data that can be manipulated from the server, the ActiveX control is run by the client to edit the report configuration. Then, all the data that describe the report configuration are sent to the server for persistent storage in the database 14. The chart ActiveX control 58 is for displaying bar and pie charts on the client. Switching between the different types of charts is achieved by modifying the view in the ActiveX control without changing the data; therefore, additional requests to the server are not necessary. On the server 48, the Report Editor XML Parser 60 obtains the data from the database 14 that pertains to the client's report that the user intends to modify. These data are converted to XML format and sent to the client to pre-fill the Report Editor ActiveX control 57. The XML Parser 61 on the server is used to obtain report data from the database 14 via ADO in the form of record sets and transform those record sets into XML format. The XML is returned to the calling Active Server Page and then sent to the client for processing.

2. Report Creation Process

The process of generating a report is shown in the flow charts and sequence diagrams contained in FIGS. 6 through 23. The top level (high level report generation) sequence is shown in FIG. 6. The client browser 45 submits a report request with the report type and time range options. The selected web server in the web server farm 52 receives the report request and queries the database 14 for the desired data. The web server formats the data into an XML string and returns it to the client browser along with XSL stylesheet data. The browser receives the XML formatted data and XSL stylesheet data and displays the report according to the XSL. The process of initial client login and the steps performed to generate a report are described in detail below.

Figure 7:
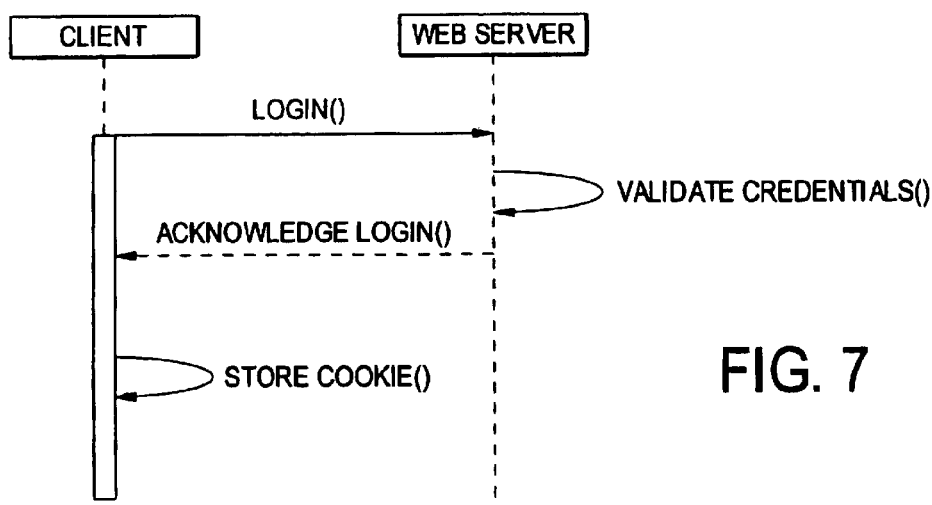
FIG. 7 is a sequence diagram for log-in and credential cookie storage by the client browser.
Figure 9:
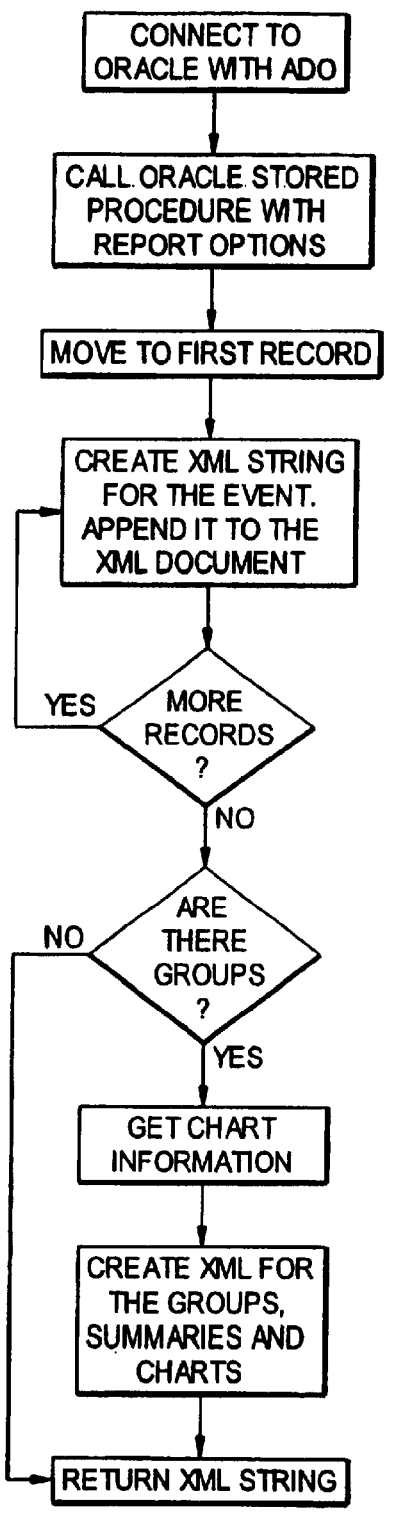
FIG. 9 is a high level flow chart of a report Component Object Model (COM) component, which creates AML formatted data.
Figure 10:
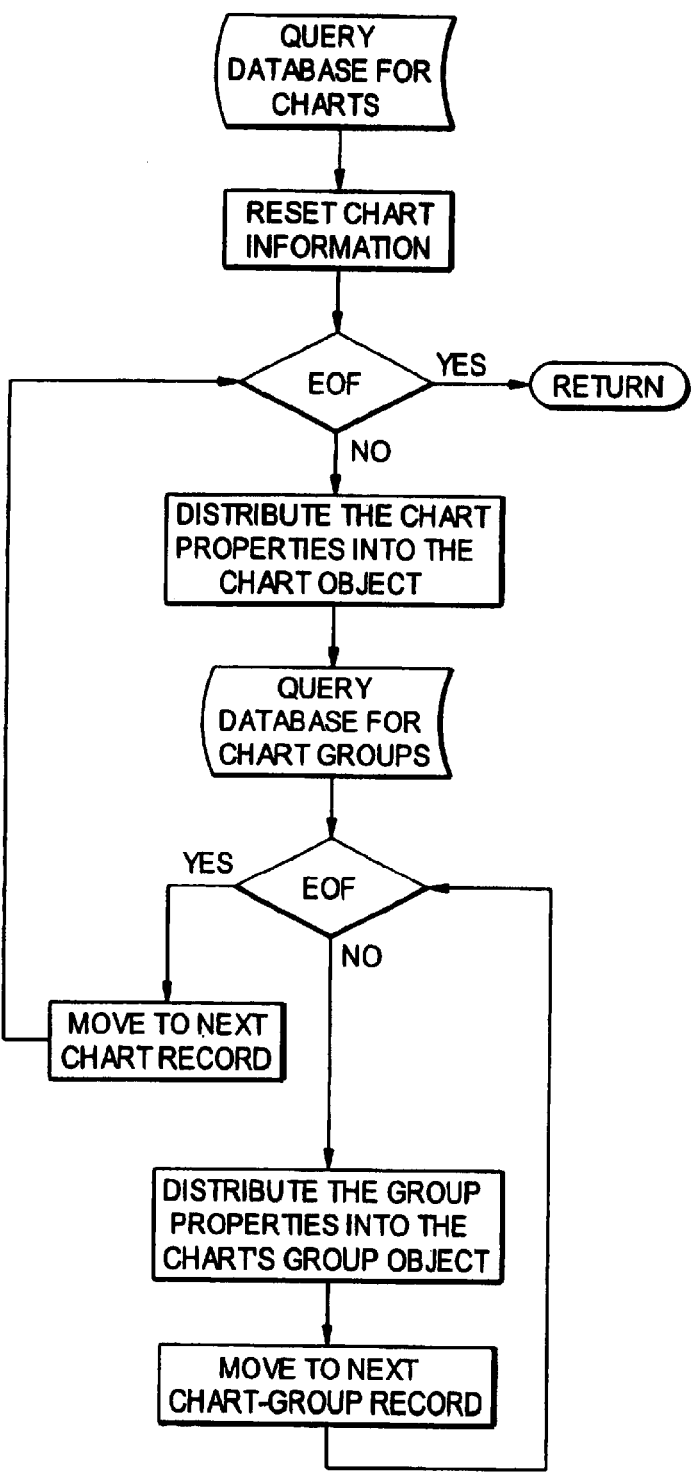
FIG. 10 is a flow chart for retrieving chart information for the report.

The login process is shown in the sequence diagrams of FIGS. 7 and 8. FIG. 7 is a sequence diagram for storing login credentials in a "cookie." A cookie is a file stored on the client that has information about which website it belongs to and the data that was stored with it. When a client logs in to the web server and is validated with an acknowledgment, the client's customer name, user name and password are stored in a cookie. FIG. 8 is a sequence diagram for credential cookie retrieval and verification by the server. When the user browses to a report web page, instead of requiring the user to enter in their credentials again, the web server gets the credentials from the cookie that is already stored on the client. The credentials are verified for each operation that retrieves data from the database for reporting. This ensures that users cannot bypass any security limits, such as an expired password, or expired access to the system, by staying logged in.

When a report request is submitted by a client browser, the web server executes a Component Object Model (COM) component on the server to fulfill the request. A flow chart for the COM component, which generates the XML from the data retrieved from the database based on report parameters passed by the client, is illustrated from a high level in FIG. 9. The component establishes a connection via ADO with the Oracle™ database, and sequentially retrieves all of the events for the report. The component processes all of the events, storing the data in local data objects while at the same time generating XML to be returned to the client's browser. Once all of the events have been processed and the XML strings generated, the component checks to see if any groups have been defined for the report. If groups exist, events are sorted into the appropriate groups, and the XML strings are generated for the groups, summaries, and charts, as required.

Event retrieval from the database and creation of the event XML are straightforward. The COM component first calls a stored procedure in the Oracle™ database. A stored procedure is a pre-compiled query stored in the database. Stored procedures are used to speed frequent queries of the same type by eliminating the step of Structured Query Language (SQL) interpretation each time a query is made. The database returns all of the events that are part of the report for the selected assets in the selected time range. The component then processes each event in turn, storing the event for later group processing and generating event XML for the report. An example of the event XML formatting for reports is shown in Example 1 of Appendix III to this specification. The XML data tags used in the reports are discussed briefly below, and defined in detail in the Tables listed in Appendix II. The event XML contains the event type, location, time, site location identifier and name, asset identifier, and mileage. It also contains engineering data not normally shown in an end user report, for debugging purposes. These data include the tracker identifier used by the network routers, the sequence number of the event data packet, the time the packet was received, and other status flags. Once XML is generated for all of the events, the component goes on to process groups that are defined for the report.

If groups exist, the reporting system first retrieves chart information for the report from the database. The chart data retrieval process is shown in detail in FIG. 10. Simply put, each chart defined for the report is read from the database; then, each group to be included in each chart is read. These are stored for later processing for the creation of vehicle and fleet summary charts.

Grouping of events is an important and powerful reporting feature to help a manager evaluate the information in the event reports. Groups are created by selecting a start event and an end event. The reporting subsystem then determines time and, if desired, distance, between events. These group times can then be rolled up into vehicle summaries, and trends in reported data such as cycle times can be analyzed.

Examples of different types of reporting are:

Time between events

Total time for the group

Mileage between events

Total Mileage for the group

Definition of a slice on a Pie Chart

Calculate customer costs/profits

An example of a group start/end event pair for a ready-mix concrete truck at a specific work site is a start event of "Begin Pour" and an end event of "End Pour" for the group "Pour Time." Groups can be further customized by selecting the first event in a date/time range and the last event in a date/time range, or the first group in a date/time range and the last group in a date/time range. For example, a group designated "Time Worked" may have a start event of "First Ignition On" and an end event of "Last Ignition Off." Offsets can be applied to groups to modify the group total time. Using the above example, the customer may want to pay its drivers for "Time worked" plus 15 minutes, and would accomplish this by entering in a group offset of 15 minutes.

Figure 11A:
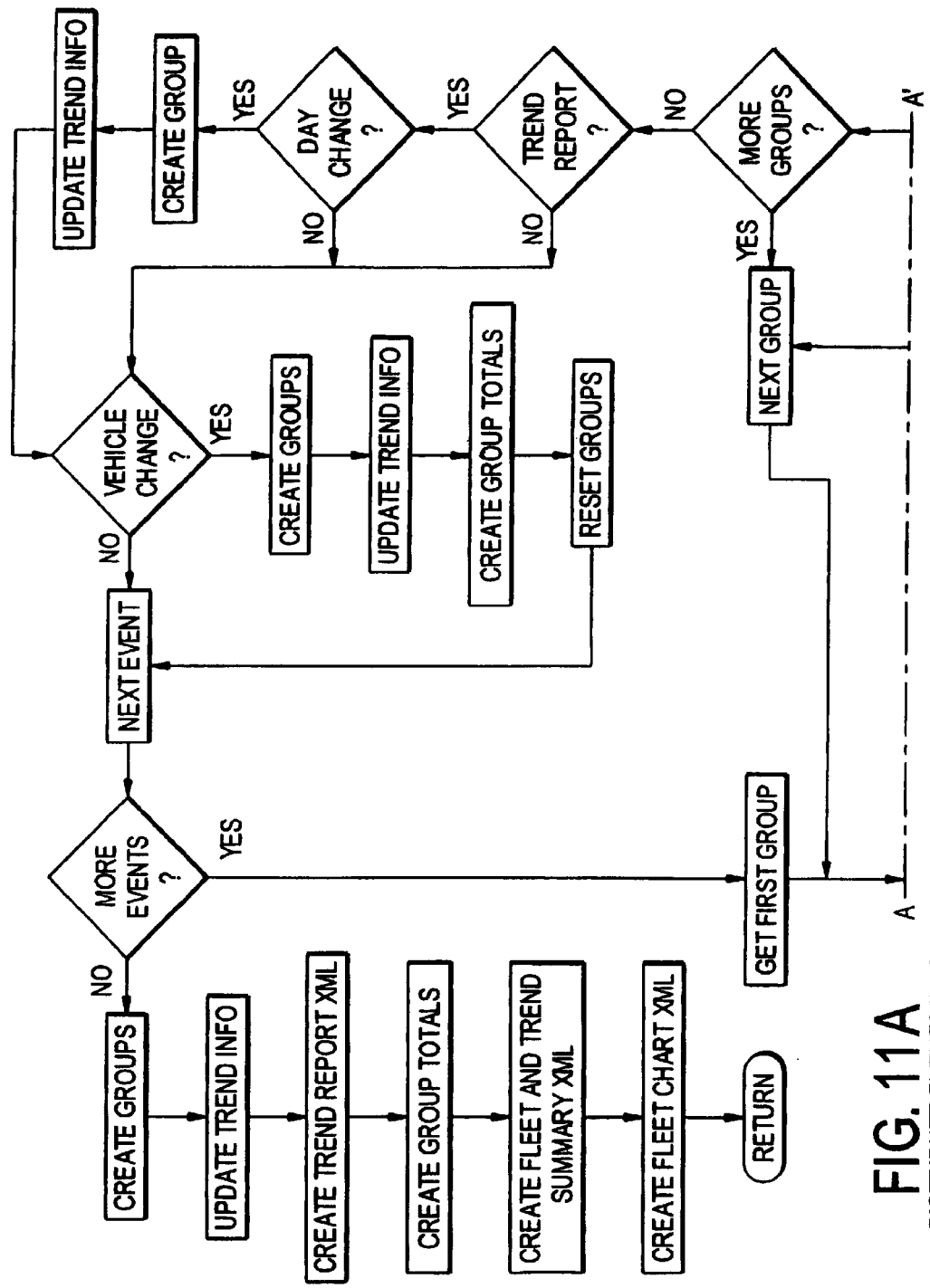
FIG. 11 is a flow chart for distributing events into groups.
Figure 11B:
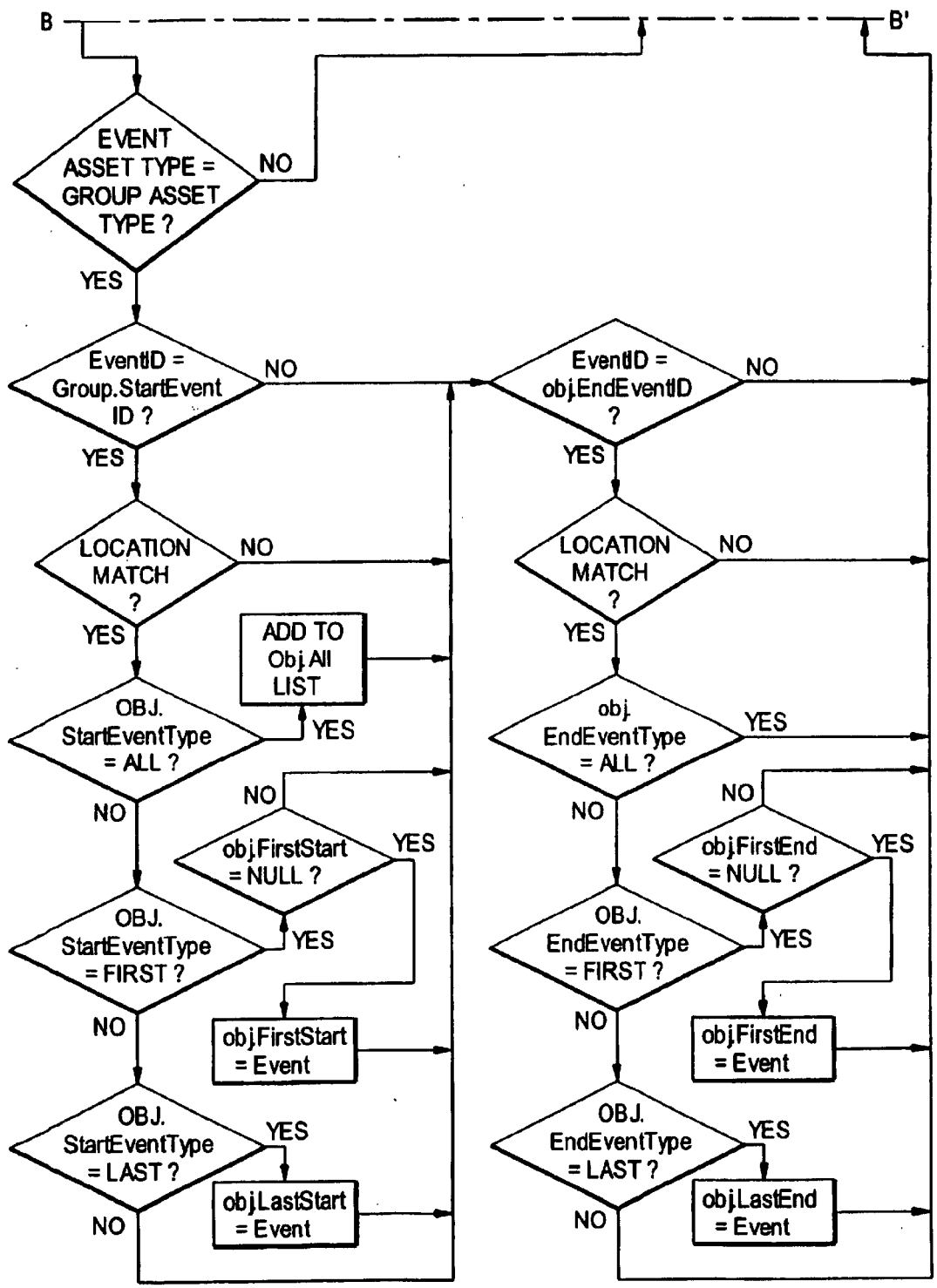
Figure 12:
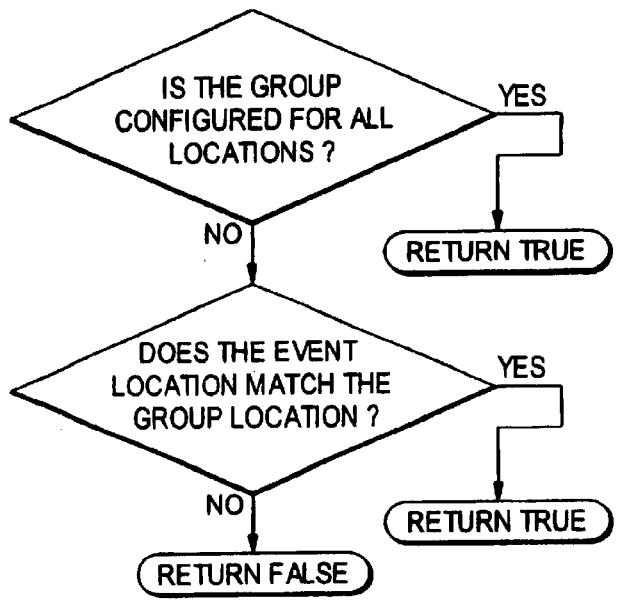
FIG. 12 is a flow chart for determining if an event's location matches the group location required for the report.

The process of creating and reporting on groups is shown in detail in FIGS. 11 through 23. FIG. 11 is a flow chart for distributing events into groups, illustrating the detail for filling groups with event data for a particular report and listing the subsequent processes once all events are processed. The distribution of events into groups and the other processes are described below.

If the report has one or more associated groups the component proceeds by reading all group and chart information from the database. Once all configurations for the groups have been read, the component proceeds to distribute the events into group objects for processing as shown in FIG. 11. Each event that occurs is checked against all groups for the report. If the event falls into any of the groups listed then it is added to the appropriate object for processing.

Groups are calculated by processing the events added to the group objects. Groups can be set up to include only specific locations or all locations where an event occurs. Users are given even greater flexibility beyond setting up groups to include specific locations. Users can also configure groups to be generated based on all occurrences or only the first or last occurrences of events as listed below:

a) all occurrences of the start and end events;

b) all occurrences of the start and the first occurrence of the end event;

c) all occurrences of the start and the last occurrence of the end event;

d) first occurrence of the start event and all occurrences of the end event;

e) first occurrence of the start event and the first occurrence of the end event;

f) first occurrence of the start event and the last occurrence of the end event;

g) last occurrence of the start event and all occurrences of the end event;

h) last occurrence of the start event and the first occurrence of the end event;

i) last occurrence of the start event and the last occurrence of the end event.

These cases are handled by a combination of event types and group types. Within a group, the start event and end event may each be defined as "First," "Last," or "All." A group can be defined in the same way. Three examples of event settings are given below:

a) Start="All" and End="All": Each detected pair of events creates a separate group.

b) Start="All" and End="Last": Each detected start event is matched to the last detected end event in the time range, and a group is generated for each start event with that common end event.

c) Start ="First" and End ="All": Each detected end event is matched to the first detected start event in the time range, and a group is generated for each end event with that common start event.

If a group is defined as "All," then all detected groups are presented in the report. If a group is defined as "First" or "Last," then only the first or last detected group in the time range of the report are presented, respectively.

Events must be checked for the appropriate cases in each group that exists in a report. In FIG. 11, the event is first checked against each group to determine if it is included in the group. If it is, then it is either a start event or end event. The processing performed is essentially the same for the start or end events. The event distribution is entirely automatic and is based on the report configuration created by the user that is retrieved from the database 14 at the beginning of the report generator process.

First, the location of the event is checked to ensure the current group contains that location. The Location Match process is detailed in FIG. 12, which is a flow chart for determining if an event's location matches the group location required for the report. If the group event applies to all locations (e.g., work sites) or the work site of the event matches the one defined for the group, then the event is added to the group event list. The group definition is then checked to determine if the first event, last event, or all events should be included in the report. If all events are included, the event is added to the "All" list. If first events are included and the current event is the first, it is added to the "First Start" or "First End" list. If last events are included, it is added to the "Last Start" or "Last End" list.

Once all groups are checked for the event, processing is performed on the groups if a date changes, or if all of the events for an asset (e.g., a vehicle) have been processed. If the report requested by the client is a trend report, then each event is compared to the previous to see if the calendar day has changed. If the day changes then the groups, trend information, and group totals are calculated for that day before proceeding. This is done to allow the client to view trends in groups over a configurable period. If the next asset is to be processed (e.g., a different vehicle), then the groups and group totals are calculated for the asset.

Figure 13:
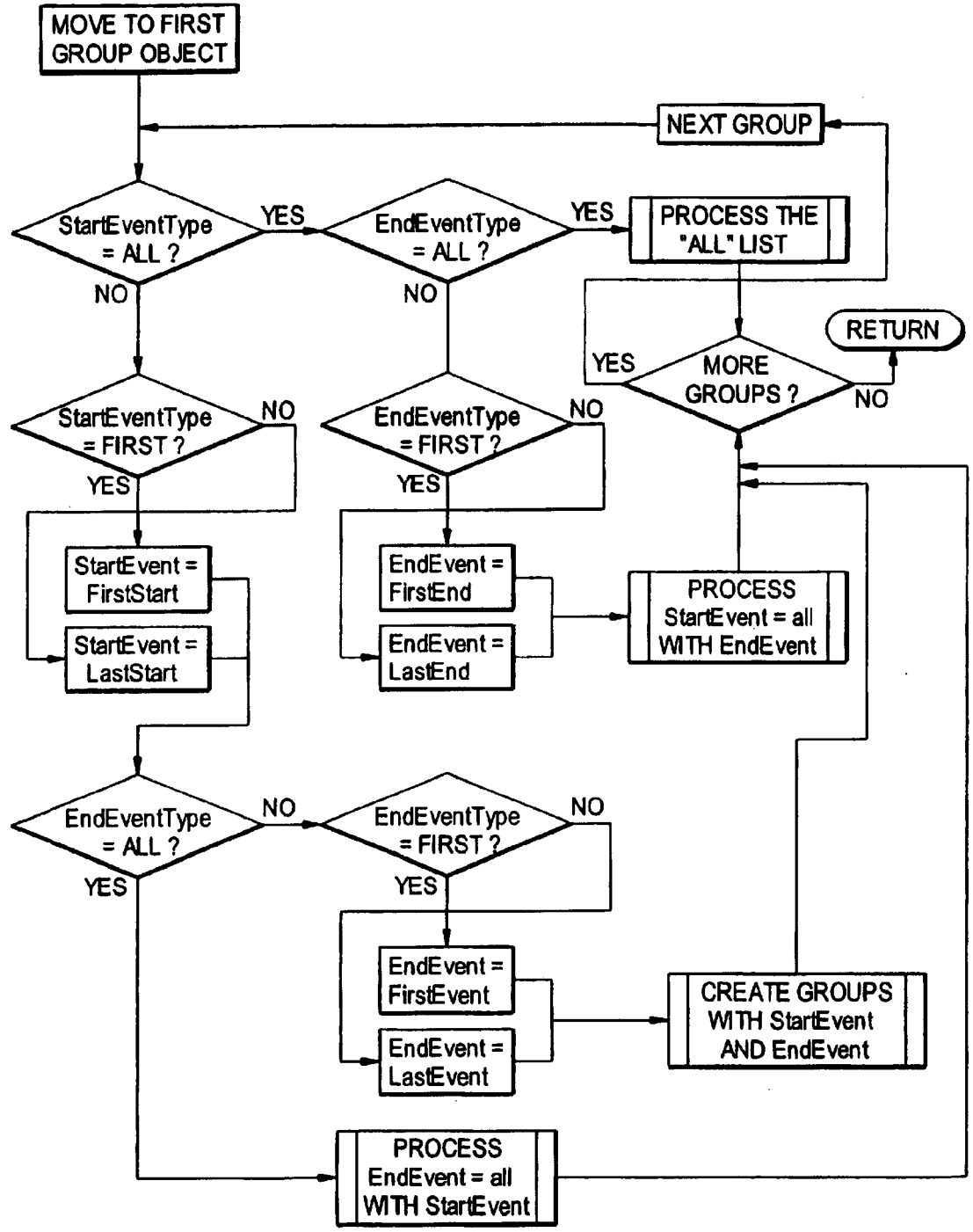
FIG. 13 is a flow chart for creating groups from the events.

The "Create Group" processing is performed as shown in FIG. 13, a flow chart for creating groups from the events. The top level group creation function in the Figure determines the type of group to process, viz.: "All" (as in FIG. 14, to be described in greater detail below, as will the other two Figures mentioned here); "Start Event=All" (as in FIG. 15); or "End Event=All" (as in FIG. 16). The events in each group are checked. If the start event type is All and the end event type is All, meaning the group is started with every detected start event and the group is ended with every detected end event, then the "All List" created in the previous step is processed. If only the first or last detected end event is to be included in the group, the "Start Event= All" processing is performed. If only the first or last detected start event is to be included in the group with every detected end event, then the "End Event=All" processing is performed. If only the first or last detected start and end events are to be included, the low level "Create Group with Start and End Event" processing is performed.

Figure 17:
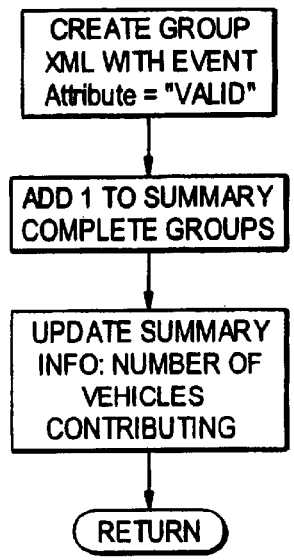
FIG. 17 is a flow chart for creating XML for a valid group.

The low level function for group creation, "Create Group with Start and End Event" is shown in FIG. 17, a flow chart of creating XML for a valid group. A "valid" group is a group that has matching start and end events. If events are unpaired, the group is "invalid." The function first creates the XML string for the group with a valid attribute flag, viz.: "<Event Group='valid'>". It then increments the number of complete groups for the group summary and updates the number of vehicles contributing to the group summary if the current vehicle had not previously contributed.

Figure 18:
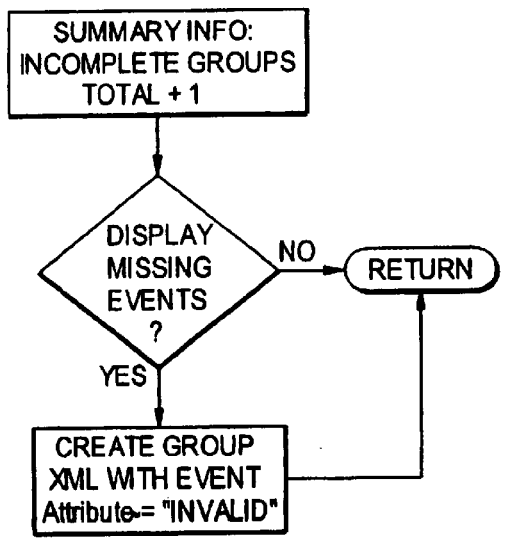
FIG. 18 is a flow chart for generating XML for an invalid group, where either the start event or the end event is missing.

Another low level function is "Generate Missing Start/ End Event," shown in the flow chart of FIG. 18. This function is executed when only the start or end event for a particular group was detected within the time range of the report. The function increments the number of incomplete events. If groups with missed events are to be shown in a report, the function generates the XML for the report with the attribute flag set to invalid, viz.: "<Event Group= 'invalid'>".

Incomplete groups may occur for a variety of reasons. Usually it is because an asset did not follow a typical business process expected for a group or a start or end event did not occur within the time range of the selected report. An example of the first possibility is a group that has start and end events of "Ignition On" and "Leave Home." If the vehicle's ignition were cycled without leaving the home site, then an incomplete group would be created. This is because the event following "ignition on" was "ignition off," not "leave home." In the second case, an incomplete group would be created if the report time span ended between the time the ignition was turned on and the vehicle left the home site. Here, the "leave home" event simply would not be in the data available for the report. Incomplete events are not included in fleet and trend summaries.

Figure 14:
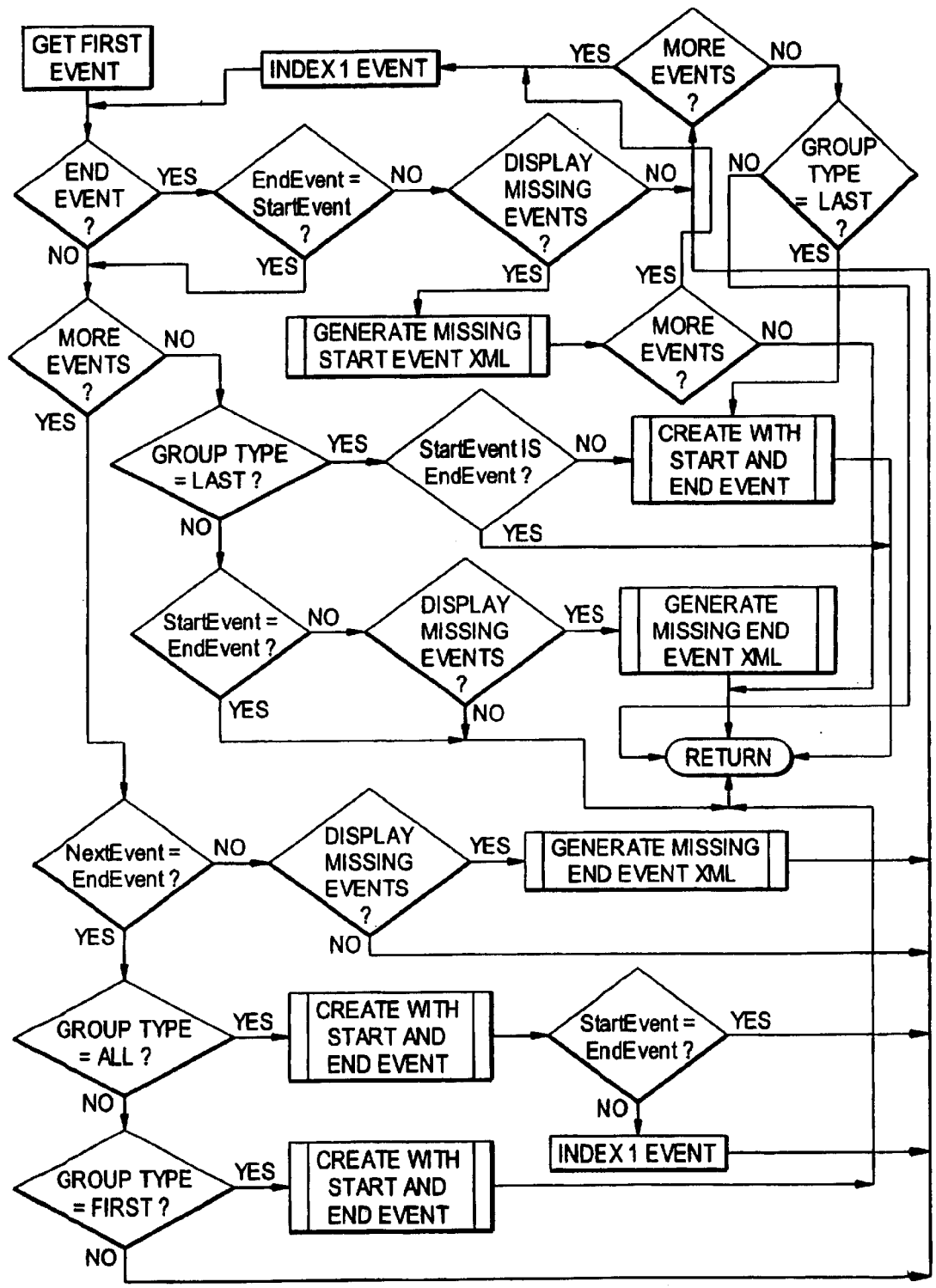
FIG. 14 is a flow chart for processing the group when configured to process all events.

The "All List" is processed as shown in FIG. 14, a flow chart for creating the group when configured to process all events. The process starts with retrieving the first event in the group, assumed to be a start event for the group. If the event is actually an end event and the start/end events are not equal for the group (e.g., the group begins and ends with "ignition on"), then "Missing Start Event" XML is generated if missing events are to be included in the report. If there are no more detected events in the group, then the function returns.

If the event is a start event but there are no more events in the group, i.e., there is no matching end event, then if the start and end events are equal, the function simply returns. Otherwise, if an end event was expected and missing events are to be displayed, "Missing End Event" XML is generated. If the group type is the last group and the start and end events are not the identical detected event, then the "Start and End Event" XML is generated. The function returns at this point because there are no more events to process.

If the event is a start event and there are more events to process, then the next event is checked. If it is not an end event and missing events are to be displayed, "Missing End Event" XML is generated. If the next event is a matching end event, then a group with "Start and End Event" XML is created if the group type is "All." In this case, if the start and end events are not equal, the event count index is advanced by one. If the group type is "First" instead of "All," "Start and End Event" XML is generated, but the function simply returns instead of checking for additional events.

The list is checked for more events if the group type is not "First" or the last event has not yet been processed. If there are more events, the event count index is advance by one, and the next event is evaluated. If there are no more events and the group type is "Last," then a final group XML with start and end events is generated. The function then returns.

Figure 15:
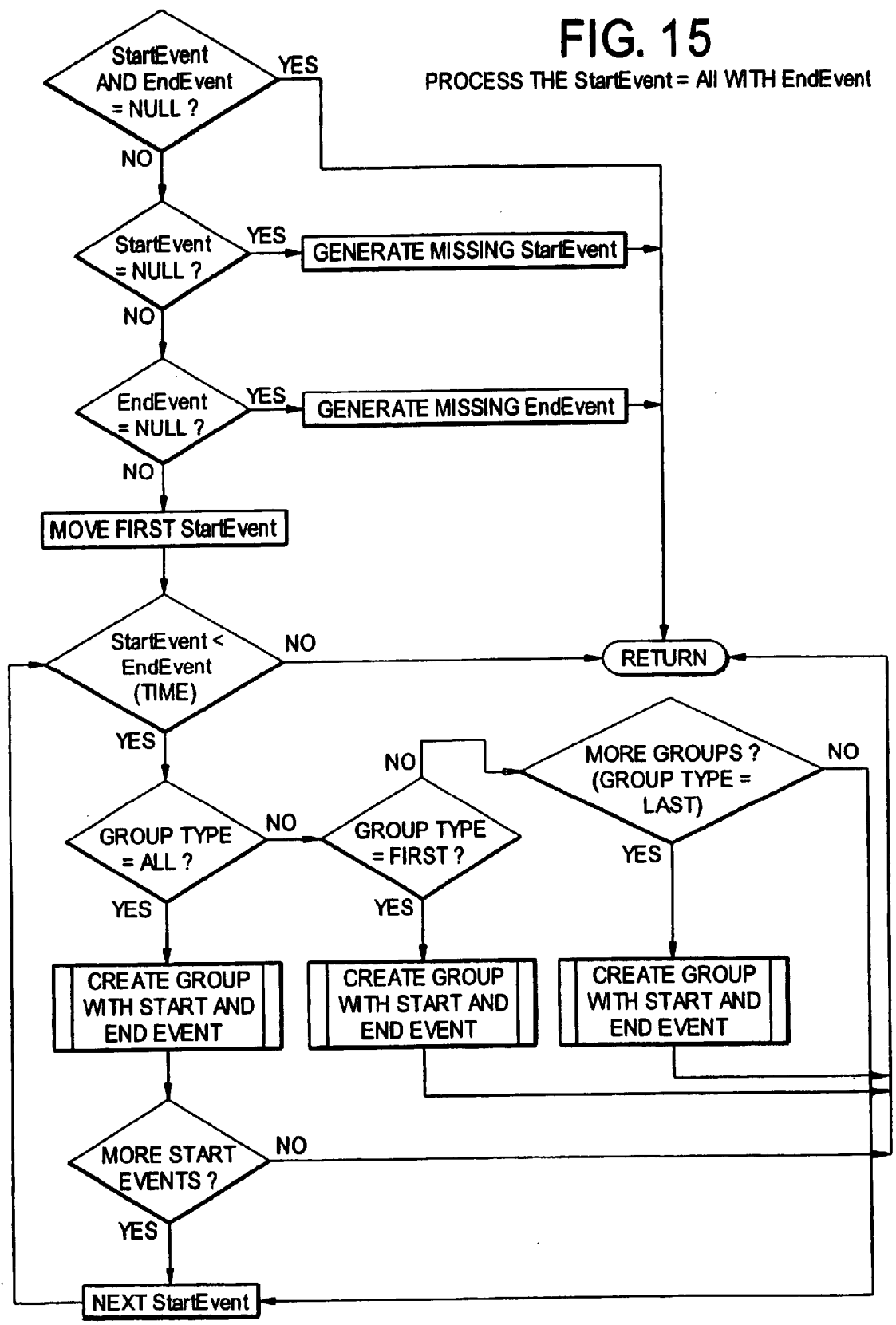
FIG. 15 is a flow chart for processing selecting all start events with a single end event.

The "Start Event=All with End Event" process is shown in FIG. 15, a flow chart for processing the selection of all start events with a single end event. This process creates groups that are bounded by multiple start events and a single end event, and an XML string is created for each detected start event prior to an end event. If the group is missing a start event or an end event, the appropriate missing event XML is generated. If both events are missing, the function simply returns without generating any XML output. For every start event with a time prior to the end event for the group, "Create Group with Start and End Event" XML is generated if the group type is "All." Otherwise, only the first detected pair generates XML if the group type is "First," or the last detected pair generates XML if the group type is "Last."

Figure 16:
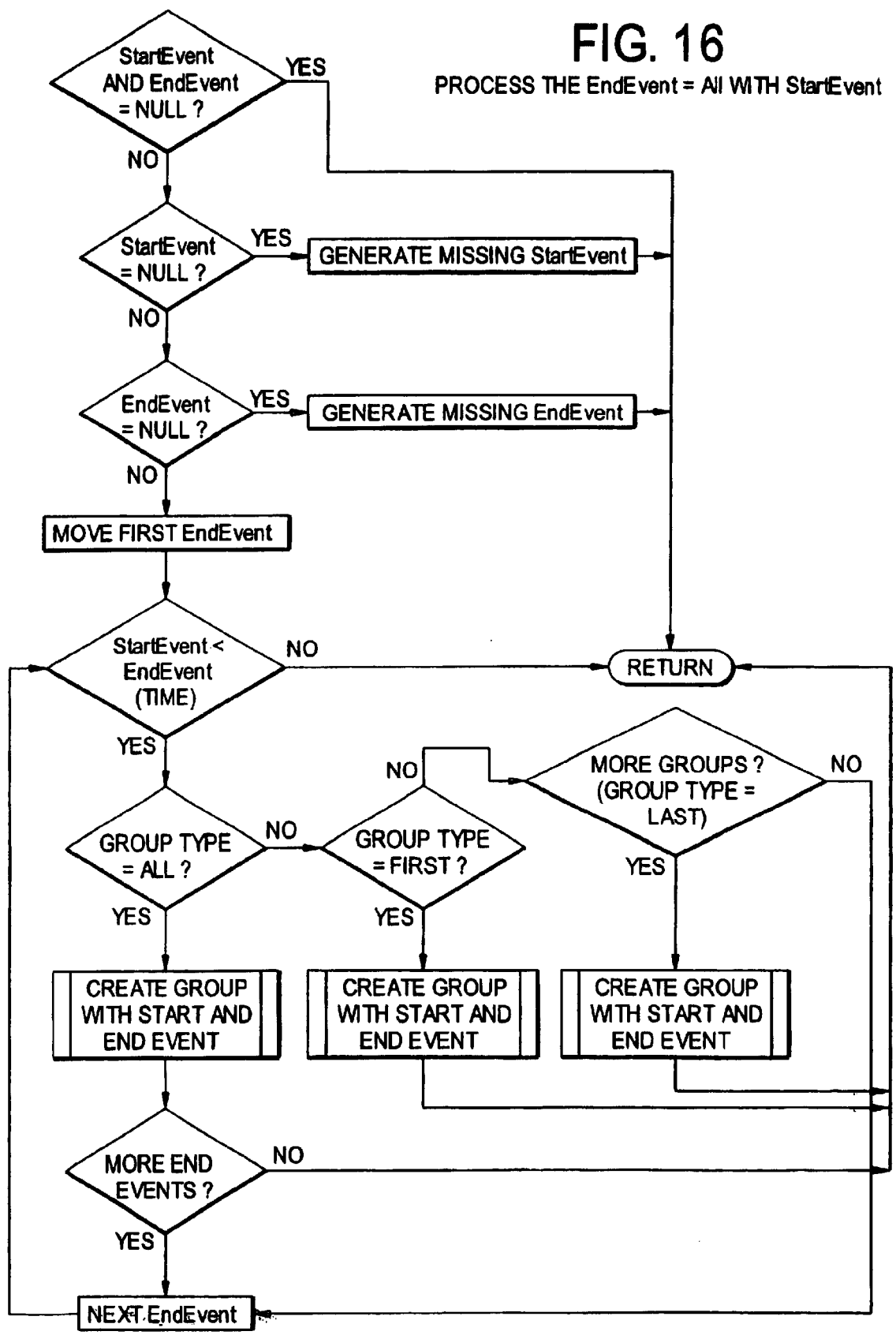
FIG. 16 is a flow chart for processing selecting all end events with a single start event.

The "End Event=All with Start Event" process is shown in FIG. 16, a flow chart for processing the selection of all end events with a single start event. This process creates groups that are bounded by a single start event and multiple end events. An XML string is created for each detected end event after a start event. If the group is missing a start event or an end event, the appropriate missing event XML is generated. If both events are missing, the function simply returns without generating any XML output. For every end event with a time after the start event for the group, "Create Group with Start and End Event" XML is generated if the group type is "All." Otherwise, only the first detected pair generates XML if the group type is "First," or the last detected pair generates AL if the group type is "Last."

Figure 19:
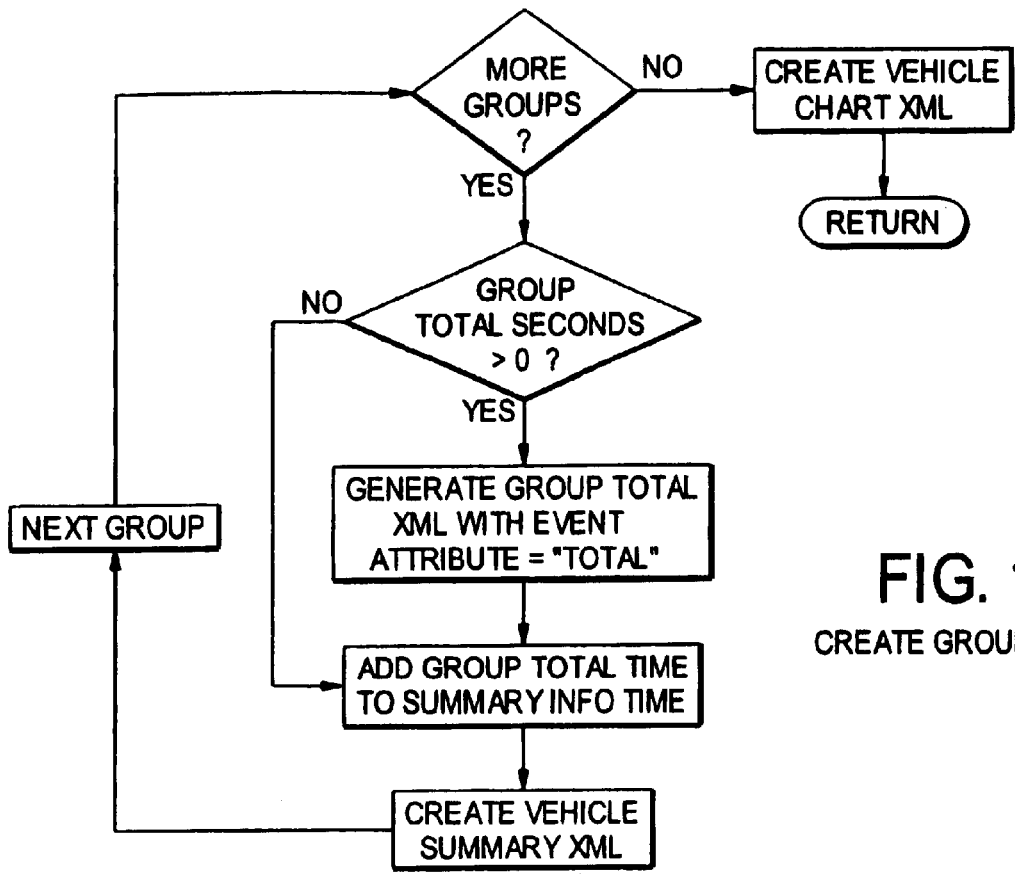
FIG. 19 is a flow chart for generating group totals XML.
Figure 20:
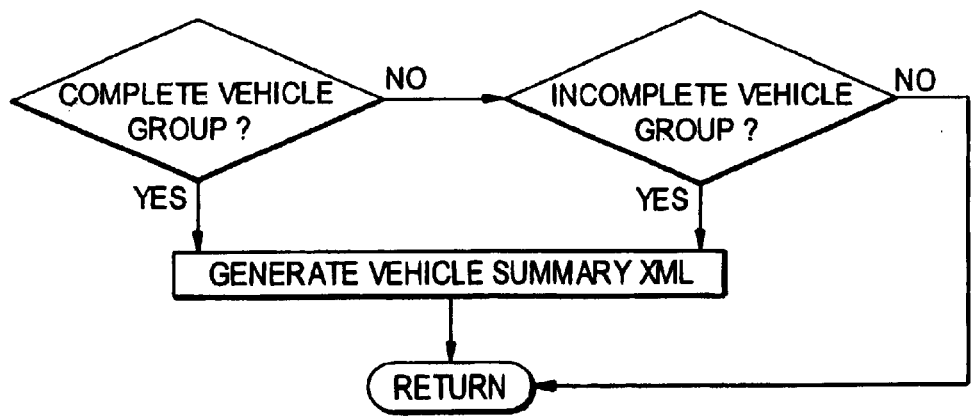
FIG. 20 is a flow chart for generating vehicle summary XML.

Once all groups for a given vehicle/asset have been created, the group totals can be determined. The flow chart for the generation of group totals is shown in FIG. 19. For each group detected for the vehicle with a positive time duration, a "Group Total" XML string is created. The "Vehicle Summary" XML is then generated as shown in FIG. 20. The vehicle summary contains a running total of time and mileage for each group and the number of groups of each type encountered in the processing. It also counts the number of complete and incomplete groups.

Figure 21:
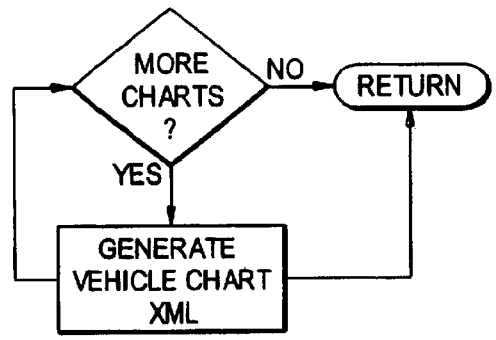
FIG. 21 is a flow chart for generating vehicle summary chart XML.

When all of the detected groups are processed for totals, "Vehicle Chart" XML is generated as shown in FIG. 21. An XML string is created for each chart in the report. A vehicle chart is made up of summary data from one or more groups for that vehicle. When the vehicle/asset summary and group totals XML have been created, the values are reset for the next asset (vehicle); however, a running total remains stored for a fleet summary XML, which is generated at the completion of the report.

The next step is to generate summary data that aggregates all assets or vehicles across an entire fleet to determine total and average group statistics. This process of creating "Fleet Summary and Trend Summary" XML is shown in FIG. 22. Fleet summaries consist of totals and averages for the entire fleet. Trend summaries consist of a series of daily group totals for a span of several days or weeks. The vehicle summaries for each group are processed and accumulated into complete and incomplete groups and the XML strings are generated.

Before combining all of the XML tags into a large XML document to return to the client, the component completes the generation of the "Fleet Summary Chart" XML as shown in FIG. 23. These charts are for groups aggregated across the entire fleet of vehicles. This is the last step because all of the data created in processing the report are needed for this piece. All of the XML tags generated are appended to the end of the event XML tags. This step is shown as the next to last step in the high level flow chart of the report COM component of FIG. 9, which creates XML formatted data. The final step illustrated in that flow chart is to return the combined XML string to the client. The XML data for the report is then formatted on the client browser using the supplied XSL style sheet.

3. Report Data Transmission and Formatting

All reports are passed from the web servers to the client in XML format. This format gives the user considerable flexibility in the desired formatting of the data for display. For example, if the preference is to see only the groups for a specific report, the user can click on "Groups Only" using a view change interface illustrated in FIG. 34 (to be discussed further below). The browser then applies the groups-only XSL stylesheet to the existing XML data and the new report is displayed. By leveraging the power of XSL and XML, the client is provided with what appears to be new report just by applying different styles to the existing data. This eliminates a round trip to the server to rerun a report and format it for display, thus increasing the responsiveness of the report and decreasing the resource hit on the web servers. All report views use the client's processor to reapply the different style sheets to the XML data.

Referring again to the XML generated for a report shown in Example 1 of Appendix III, the example is for a report with groups and events where missing events are hidden. In this example the invalid group tags will not be displayed to the user. The report's XML contains sub tags that the XSL stylesheet uses for formatting the data for display. For example, when the user requests an "Events & Groups" view, the XSL stylesheet is only concerned with "<Event>" tags because all event and group related data are contained within the "<Event>" tags. All group data are contained in tags of the form "<Event Group='valid'>", and all group total data are contained in tags of the form "<Event Group='total'>".

The stylesheet, exemplified in Example 2 of Appendix III, transforms XML into a report. It compares each tag to the previous tag, using Java Script, to determine if the events are for a new asset using the NewAsset function. If the asset changes, a horizontal rule is placed on the page to distinguish the different assets on the report. The stylesheet also identifies date changes using the NewDate function, and reports only display the date if the date changes. This eliminates the clutter and confusion of displaying the date for each event. The stylesheet applies different formats for valid groups and group totals. For instance, if the stylesheet comes across an XML tag indicating an incomplete group, i.e, <Event Group="invalid">, the stylesheet displays the information in red or otherwise highlights it to indicate to the user that either a start event or an end event for the group is missing. In this example, Events & Groups, the XSL stylesheet does not process XML tags for Summary and Chart. Those tags are used only when a user requests a summary or chart view of the report.

Report data sent to the browser are formatted in XML, with use of XML data tags listed in Table 1 through Table 8 of Appendix II to this specification.

The tags are separated by function in the report data. Each table identifies the sub tags for the following primary tags: <Event>, <Event Group='valid'>, <Event Group='total'>, <Vehicle_Summary>, <Fleet_Summary>, <Vehicle_Chart>, <Fleet_Chart>, and <Trend>.

Table 1 describes the XML tags and data that are created for each valid event in the report. Every meaningful report contains event data. Event data is only omitted from a report if none were found in the database. If a report has groups defined, complete groups derived from the events in the report have their own XML tags.

Table 2 describes the XML tags and data that are created for each complete group in the report.

Table 3 describes the XML tags and data that are created for each group total in the report. Group time totals are generated for each asset that has complete groups.

Table 4 describes the XML tags and data that are created for each vehicle summary in the report.

Table 5 describes the XML tags and data that are created for each fleet summary in the report.

Table 6 describes the XML tags and data that are created for each vehicle chart in the report.

Table 7 describes the XML tags and data that are created for each fleet chart in the report.

Table 8 describes the XML tags and data that are created for each trend report.

The XML tags are readily applied by the reader to discern the significance of the report data in Example 1. Thus, from Table 1, the <Event_ID>53 designated in Example 1 indicates the unique numerical ID for this event. All of the information concerning the <Event> is contained in a child tag. The event <description> is "Bed Up" which is indicative of a dump truck (identified elsewhere in the report) in the client's fleet unloading material. The <Latitude> and <Longitude> respectively indicate latitude and longitude from GPS (Global Positioning System) where the event occurred. It is unnecessary to provide further discussion of the significance of Example 1.

Use of XML and XSL abstracts the raw report data so that backward compatibility and legacy information are preserved when new data types and features are added. When new tags are added to the XML specification, the existing reports will continue to work. To change the look of reports, Active Server Pages (ASP) are used to generate XSL at runtime. This allows for flexibility to adapt to the needs of end users.

4. Reporting System Database

The reporting system uses tables in the database (not to be confused with the XML data tag tables of Appendix II) to manage and store report parameters for custom reports created by users, the types of assets, the types of events reported by each asset type, and several other parameters. The schema for the database, shown in FIG. 24, shows the relationship between the following reporting tables.

The ASSET_EVENT table stores the event IDs which are valid for a particular asset type.

The CUSTOMER_REPORT_EVENT table stores the events to be included in a particular report.

The CUSTOMER_REPORT_NAME table stores the report name, report ID and the organization ID that owns the report.

The CUSTOMER_GROUP table stores the parameters that define a group in a report. These are group name, group ID, start event ID, end event ID, start event type (all, first or last), end event type (all, first or last), total offset (value in seconds to add or subtract off the calculated total for this group), value per hour (dollar amount to multiply by a calculated total time for this group), display missing events flag (tells the report whether or not to show missing events), group type (all, first or last), asset type ID, report ID, display mileage flag, start location ID, end location ID.

The REPORT_EVENT_COLOR table stores the event ID, record type ID (tells whether the color is based on mileage, data value, or time), the upper and lower value that determines when this color should be used in the report and the RGB (Red, Green, Blue) value for the color.

The CUSTOMER_GROUP_COLOR table stores the group ID, record type ID (tells whether the color is based on mileage, data value, or time), the upper and lower value that determines when this color should be used in the report and the RGB value for the color.

The CUSTOMER_CHART_GROUP table stores the pie slice definition and colors for a chart. It contains the chart ID, group ID, report ID and the RGB value for the color of the slice.

The CUSTOMER_REPORT_CHART table stores the report definition of a chart. It contains the chart ID, report ID, asset type ID, chart name, chart units (default hours or minutes), default chart style (pie or bar), show legend flag, show, labels flag, show title flag, view 3D flag, animate chart flag.

The MY_REPORT_CONFIGURATION table stores information of a group of reports to display for a particular user. It contains person ID, role ID, report ID, sort order, default view (events, events and groups, chart, fleet summary, vehicle summary), days from today (relative start date), number of days (relative end date), and display logo flag.

The MY_REPORT_LAYOUT table stores information on how to display reports in the MY_REPORT_CONFIGURATION table. It contains person ID, role ID, number of columns and vehicle list ID (the vehicles to include in the report).

The VEHICLE_LIST table contains a list of assets. It is used to filter reports for groups of vehicles. It contains vehicle list ID, organization ID, and the name of the vehicle list The VEHICLE_LIST_ASSET table associates a vehicle list ID with one or more asset IDs.

5. User Interface and Report Examples

The user interfaces for creating and generating reports are described below. The process of creating custom reports and charts is outlined and example reports are shown. Special, active features of the reports are also illustrated. The report examples are those for fleet vehicles connected to the Gateway. Other types of reports in other applications are possible. The data entry screens are implemented with a combination of DHTML with Java script and ActiveX (a software component technology from Microsoft) controls.

Upon logging into the reporting system, the user is presented with the report options screen shown in FIG. 25. This interface provides for the selection of an existing report or the creation of a new, customized report. It also allows the user to select the vehicles to be included in the report, the report time span and type.

Two reports are always available on the report options screen, viz., Event Report and Last Known Position (not shown on the screen depicted in FIG. 25, but available from the Report pull down list). The Event Report displays the occurrence of every event for the selected vehicles for the selected time range. The Last Known Position report displays the last known event for the selected vehicles for the selected time range. Beside each event the user can click on the map icon, which will display the vehicle location on a map when that event occurred. Other reports, which appear in the Report pull down list, are custom reports created by the user. These reports are on a per customer basis, meaning that if one user creates a custom report, another user belonging to the same organization can run, edit and delete those reports.

The other options are New, Edit, Delete, and Time Format. The New option displays the report editor. This allows the user to create new reports by selecting events, creating groups and charts, and other report options. The Edit option also displays the report editor. In this case it allows modification of an existing report. The standard Event and Last Known Position reports cannot be edited. The report editor is discussed in detail below. The Delete option removes the selected report from the report list. But as with editing, the standard Event and Last Known Position reports cannot be deleted. The Time Format allows the time displayed in reports to be change between 12 and 24 hour formats.

The second section of the report option screen of FIG. 25 is the vehicle list. The vehicle list is a pull down menu of named lists or groups of vehicles. It allows the user to select all, or a subset of the assets or vehicles to be displayed on the report. This helps to limit the report size when the user has a lot of vehicles. All Vehicles is the default option. The View option shows the vehicles included in the selected vehicle list.

The other options in the vehicle list section are New, Edit, and Delete. The New option displays a list of the available assets with check boxes beside each, to select the assets to be included in a new vehicle list. The user must supply the name of the new vehicle list. The Edit option displays the vehicles in the selected, existing list and allows the list to be modified. The default All Vehicles list cannot be edited. The Delete option removes the selected vehicle list. The default All Vehicles list cannot be deleted.

The final section of the report option screen allows the selection of the report start time, end time, and type. The Start Date/Time is the start time of the report. The End Date/Time is the end time for the report.

The Type option selects the type of report to generate. There are three types of reports. The Event report is used to display events, groups, summaries and charts for the selected report. This report is sorted by date/time and grouped by vehicle. The Location report is used to display events, groups, summaries and charts for the selected report for events, which occur at a location. This report is sorted by date/time and grouped by location and vehicle. The Trend report displays a bar chart of the trend information for groups. This report is only valid for reports which have defined groups.

Finally, the Generate button causes the reporting system to query the database for the specified report with the indicated vehicle list, time span, and type. The report is returned as a web page. A portion of a typical event report is shown in FIG. 26. The main body of the report shows events reported by assets sorted by time and grouped by asset. The particular exemplary report displayed in the Figure shows events for a vehicle 124.

Figures 24B, 28:
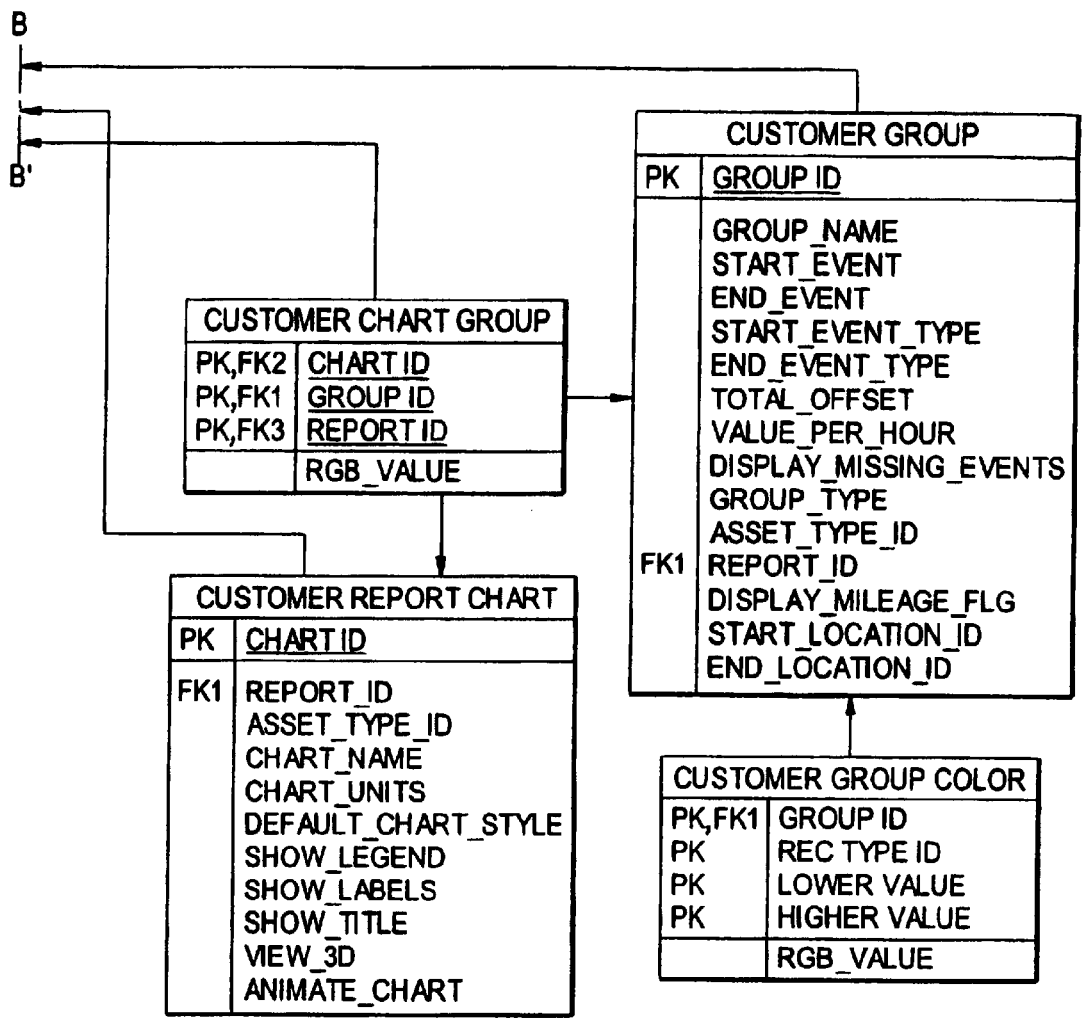
FIG. 28 illustrates the vehicle information presented when the vehicle information icon selected on the report options screen.

Icons (identified at the top of the screen in FIG. 26) to the left of each event in the report provide additional details about the event. The first icon is the Show Map icon and is available if location data are valid for that event. Clicking this icon with the mouse causes a map display to be presented in a manner similar to that shown in FIG. 27. The next icon to the right is the Vehicle Information icon. Clicking this icon with the mouse causes a pop up window to be displayed with numerical latitude and longitude as well as vehicle mileage as shown in FIG. 28. The third icon is the Work Site (or Job Site) icon. It identifies the event as occurring at a defined home or job site as reported by the asset. The name of the work site can be displayed by placing the mouse over the icon. A tool tip will display the name of the site as shown in FIG. 29, which is a portion of the screen similar to that shown in FIG. 26.

Active icons are placed on the report page using XSL stylesheets. Example stylesheets for each icon type are shown in Examples 3, 4 and 5 of Appendix III. For each ICON, the XSL interprets the XML data to identify certain tags that control the display of the icon.

Example 3 shows the XSL stylesheet for displaying the Show Map icon on a report page. The XSL stylesheet checks the XML for the following tags: <MQ_Lat> and <MQ_Long>. If they exist, then the ShowMap icon is added to the output along with the click event containing the data to retrieve the map from Mapquest. The "<xsl:attribute name="onclick">" segment is executed when the icon is clicked. It creates a new pop-up window and passes the parameters to Mapquest which in turn delivers an image to be displayed. If the <MQ_Lat>tag does not exist, the ShowMap icon is not drawn for that event.

Example 4 shows the XSL stylesheet for displaying the Vehicle Information icon on a report page. This icon is always available. The "<xsl:attribute name="onclick">" segment is executed when the icon is clicked. It creates a new pop-up window and passes the name of the vehicle to a separate ASP page for data retrieval and display. When the page is called the server looks up the information in the database and displays it to the user. If the latitude and longitude are not present for the event, then no data are displayed for the fields.

Example 5 shows the XSL stylesheet for displaying the Work Site icon. The type of icon displayed is determined from the type of site associated with the event in the report. The code checks the <Location Type> tag. If the tag is missing, then the event did not occur within a site, and an icon is not displayed. If it occurred within a site, the appropriate site type icon is displayed. The system provides for different types: home, job, type sensitive job, and user defined. Home sites typically represent the yard, home office, or frequently visited pick up points for vehicles. Job sites represent where work is to take place; time sensitive job sites are alternative sites for long duration jobs. The platform provides for additional definitions of site types, and these are displayed as user defined sites.

An example of a last known location report is illustrated in FIG. 30. It shows the last reported event from an asset. The location of the event can be determined from the Show Map or Vehicle Information icons.

The vehicle list editor allows the user to create and modify new vehicle lists. The user interface is shown in FIG. 40. When New or Edit are selected in the vehicle list section from the initial selection screen, the user is presented with a web page exemplified by that shown in FIG. 40. The user supplies a vehicle list name such as "dump trucks" and checks the vehicles to be included in the list. When the list is saved, the web server updates the database with the new or modified list. The Vehicle_List table is updated with a new vehicle list, and the vehicles in the list are added to the Vehicle_List_Asset table.

The report editor allows the user to create and modify new reports. The reports can be simple event reports that contain only events of specific interest or can contain grouped events and charts. The report editor is an ActiveX control that is run by the web browser when New Report or Edit Report is selected from the initial selection screen. It is a wizard-like interface that leads the user through the creation of a customized report.

Figure 31:
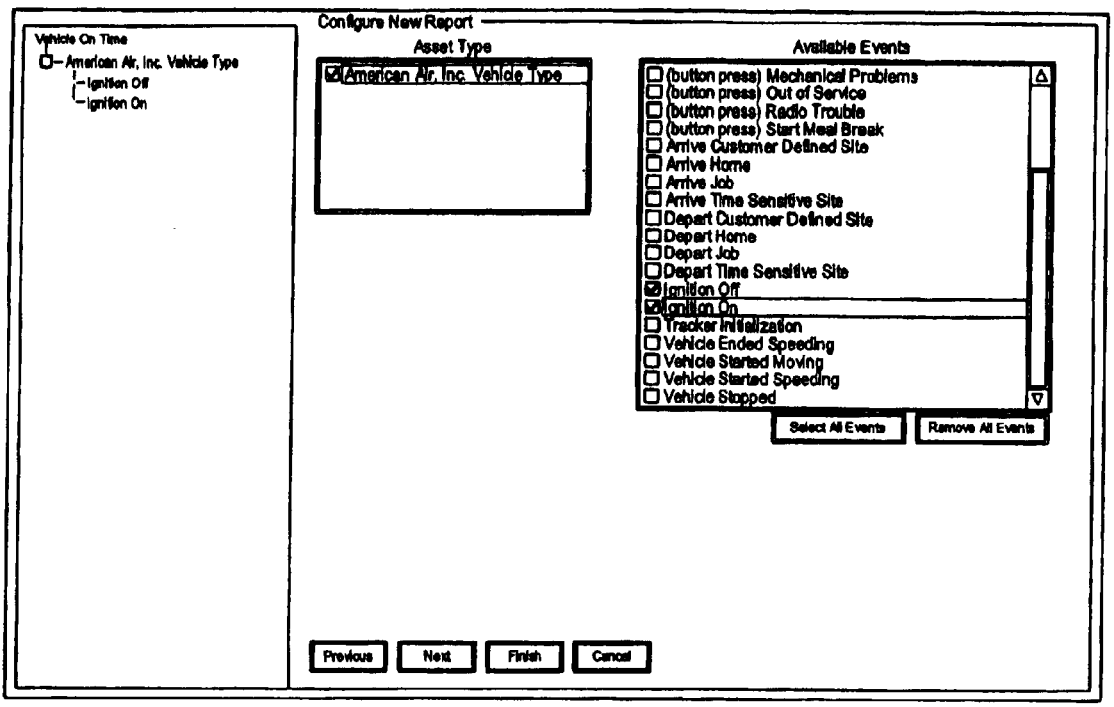
FIG. 31 illustrates the user interface for selecting events to be used in a custom report, the events being available for creating subsequent event groups.
Figures 41, 42:
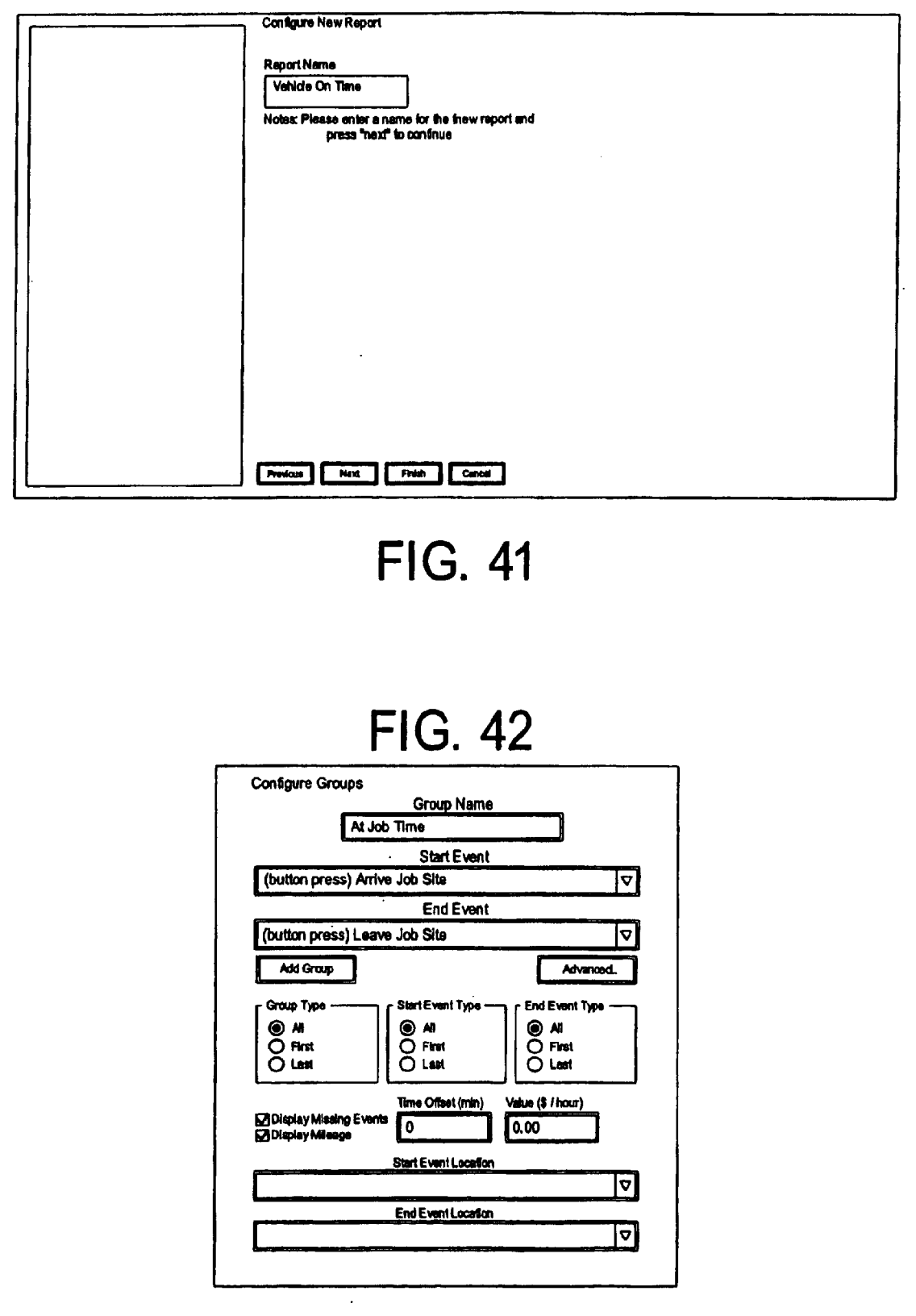

An example of the user interface screen for event selection for group creation is shown in FIG. 31. First, the report must be assigned a name that is representative of the information presented by the report. For example, a report which shows the period of time that a vehicle is running, could be named Vehicle On Time. The user interface for supplying a report name is shown in FIG. 41. When the report is created, the system stores a unique report ID, the customer ID, and the supplied report name in the Customer_Report_Name table by inserting a new row.

Pressing 'Next', will display a list of asset types available to the user. It is possible that the user has only one asset type, such as a fire truck. Or the user could have fire trucks and ambulances. The reason for the distinction is that each asset type may be able to report different events. Checking the box beside an asset type will display a list of valid events for that asset type. The user can now select the desired events to display for the report. Using the Vehicle On Time example, the user would select Ignition On and Ignition Off as the events to display. For each event selected, a row is inserted into the Customer_Report_Event table; the row contains report ID, event ID, and asset type ID for each event selected for the report. If the user is only interested in a report of all Ignition On and Ignition Off events, the report is already complete. The user would press finish and select Vehicle On Time from the report list and generate the report.

Figure 32:
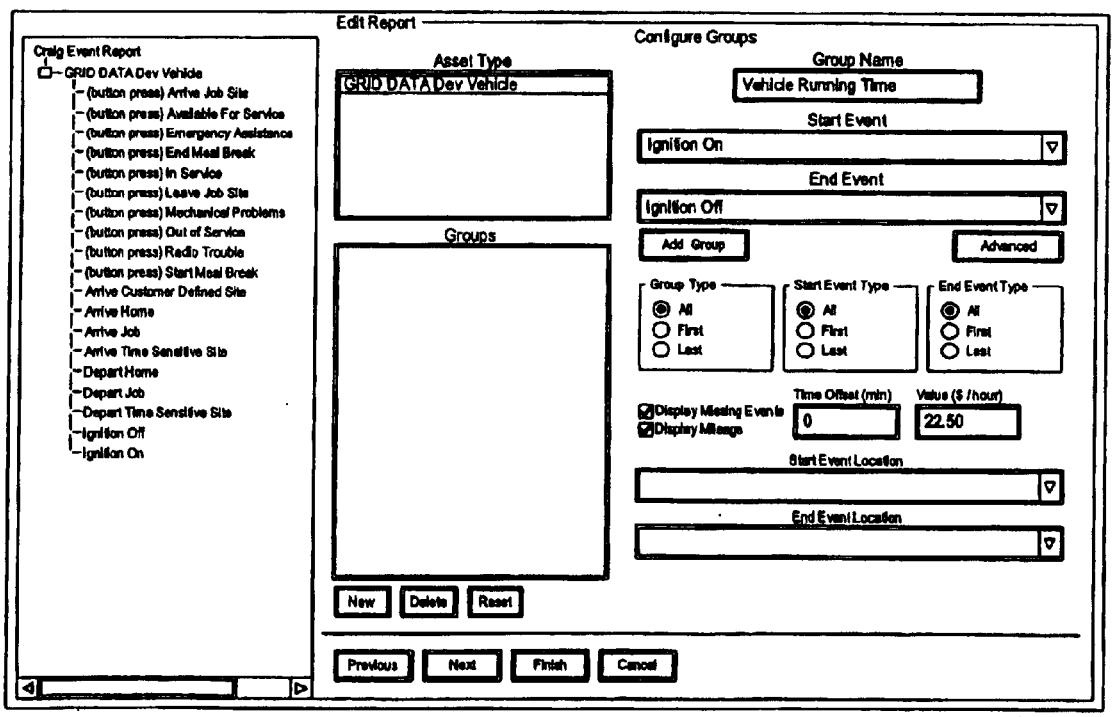
FIG. 32 illustrates an exemplary user interface for creating event groups in a report.

Logical groups of events are used by the report generator to compute data relating the group start and end events. For vehicle fleets, the data of interest are usually time and distance between the events. Selecting Next from the event selection screen of FIG. 31 moves to the group creation screen shown in FIG. 32.

In this example, the start event is Ignition On and the end event is Ignition Off. A group will provide the difference in time between two events and the difference in miles between two events. To create a group, the user must select a Group Name, a Start Event and an End Event. The Start Event and End Event pull down boxes only display the available events, which were selected on the previous screen. Once the required information is provided, Add Group is selected to save the group.

If the user selects the Advanced option, he is presented with additional parameters to further configure the group. The advanced parameter options are shown in FIG. 42. The interface allows the user to select the Group Type as "All," "First," or "Last"; "All" is the default value. It also allows configuration of the start and end event types as "All," "First," or "Last"; "All" is the default value. It provides for the selection of setting flags for displaying or hiding incomplete groups (those with missed events) and displaying mileage along with time for the group. A time offset and value of the group time can be specified as well. If the start or end event is a site arrival or departure event, a specific site can be selected for the report. For example, if the user is only interested in arrivals and departures from a site called "Plant 1," that site could be selected, and the report would ignore groups that have arrivals and departures from other sites. When a group is created in this way, data relating to the group are stored in the Customer_Group database table. A unique group ID is created, and a new row for each group is stored that contains the information about each parameter that was selected above.

An example of a Vehicle On Time report is shown in FIG. 33. The report is similar to the event report shown in FIG. 26, but now the Vehicle Running Time groups also appear, i.e., in a combined event and group report. At the bottom of each asset, the Total Time and Mileage for the group is also displayed.

Reports that have groups also have an additional menu button on the report page called Change View, as shown in FIG. 34. This button allows the user to change the presentation of the report to show:

1. Events with groups as shown in FIG. 33;
2. Groups only;
3. Events only;
4. Summary of all assets or individuals;
5. Charts of summary information.

FIG. 34 shows the selections available from the Change View interface. The default view is Events & Groups. The user can hide the events by selecting Groups Only, or hide the Groups by selecting Events only.

Figures 36, 37, 38:
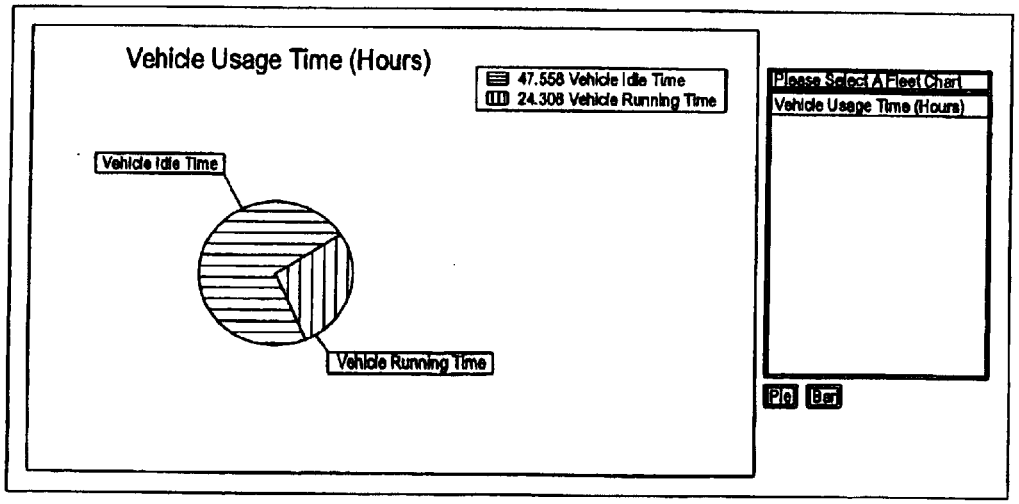
FIG. 36 illustrates a full fleet summary report for the example of running time group.
FIG. 37 illustrates a user interface for creating a graphical chart in a report.
FIG. 38 illustrates a full fleet summary chart for the exemplary running time report.

The summary reports aggregate group totals for individual assets in a vehicle summary as shown in FIG. 35, or across all assets for a fleet summary as shown in FIG. 36. The summary reports show the total number of group events reported by the assets and computes the total times encompassed by the events and the vehicle or fleet averages.

The reporting system can display the results of group reports as charts. Charts are particularly useful for comparing values for different groups. Charts are created using the interface shown in FIG. 37, which is reached by selecting "Next" from the group creation interface. The interface shown in the Figure assumes a second group called Vehicle Idle Time has been created.

The user specifies the groups to include in the chart and the name of the chart. By default, a pie chart is created that includes one slice per group included in the chart. More than one group is required for the chart to make the pay chart meaningful. The user can configure the presentation of the chart by selecting the Advance button. The user interface for the advanced configuration options is shown in FIG. 43. The user may change to chart to a bar chart, control the units of parameters shown in the legend of the chart, activate display of labels, legend, and title, animate the chart, which will present a spinning pie chart, and view the chart with a 3D perspective. The user may also select the color of each bar or slice by clicking on the sample report shown on the left side of the screen in the Figure. A color selection dialogue is then displayed to allow the user to customize the coloring of the chart slices or bars.

When the chart is created, a unique chart ID, the chart name and the parameters that describe the presentation of the chart are stored as a row in the Customer_Report_Chart table in the database. The groups included in the chart are inserted as rows into the Customer_Chart_Group table. Each row includes the chart ID, and unique group ID for each slice or bar in the chart. It also stores the color for the corresponding slice or bar. Charts are drawn in the web page using an ActiveX control called TeeChart Pro from teeMach SL.

When the resulting report is run, the corresponding fleet summary chart is shown in FIG. 38. Either a pie or bar chart can be selected. This shows a comparison of the time the fleet vehicles spend turned off versus running over the time span of the report.

FIG. 39, which illustrates a My Report Configuration page, allows the user to select a list of reports to run and display in one or two columns. After the user has customized the reports for his business needs, he can create a set of reports to generate with one mouse click. The user can select the default view, whether or not to display the company logo, and the relative date/time range for which to run the report. Each report in the set has its own set of parameters.

From the foregoing description it will be understood that the present invention provides users with sophisticated web based reports from a database. It gives users the capability to put logical pairings of arbitrary items into groups and to receive reports on data that relates the two items. It allows users to create and store various types of reports for later recall and provides users with the ability to reformat the reports without requiring additional database queries. It also provides summary and trend reports to enable data mining and analysis.

The present invention has been described with respect to its implementation in a Location Aware Wireless Gateway where it is used to report on and analyze the activities of fleet vehicles. However, the underlying design and architecture of the invention may be used in virtually any application where web distributed access to reports, from a reporting system with groups and web/XML/XSL features, is sought. In addition, the present invention has been described in conjunction with preferred embodiments thereof, however, many modifications and variations will be apparent to those of ordinary skill in the art. The foregoing description and the following claims are intended to cover all such modifications and variations.

APPENDIX I

GLOSSARY

| | |
|---|---|
| ActiveX | a software component technology from Microsoft ™ |
| ADO | ActiveX Data Objects, an application program interface for accessing databases |
| API | Application Program Interface |
| ASP | Active Server Pages |
| CIS | Customer Interface Server |
| COM | Component Object Model |
| CDPD | Cellular Digital Packet Data |
| DHTML | Dynamic Hypertext Markup Language |
| HTML | Hypertext Markup Language |
| HTTP | Hypertext Transfer Protocol |
| IE5 | Microsoft ™ Internet Explorer version 5.0 |
| IIS | Microsoft ™ Internet Information Services |
| IP | Internet Protocol |
| LAN | Local Area Network |
| RGB | Red, Green, Blue |
| SAN | Storage Area Network |
| SQL | Structured Query Language |
| TCP | Transmission Control Protocol |
| WAP | Wireless Application Protocol |
| XML | Extensible Markup Language |
| XSL | Extensible Stylesheet Language |

APPENDIX II

TABLES

TABLE 1

XML Event Data Tags

| XML Tag | Description |
|---|---|
| <Event> | The child tags contain all of the information for a valid event. |
| <Event_D> | All events that occur in the system have a unique numerical ID. |
| <Event_GMT> | The GMT (Greenwich Mean Time) when the event occurred. |
| <Latitude> | The latitude from GPS (Global Positioning System) where the event occurred. |
| <MQ_Lat> | The translation from GPS Latitude to MapQuest latitude format for requesting maps from the MapQuest web site. |
| <Longitude> | The longitude from GPS where the event occurred. |
| <MQ_Long> | The translation from GPS longitude to MapQuest longitude format for requesting maps from their site. |
| <Location_ID> | All locations (work sites) defined by customers are given a unique ID when they are inserted into the database. This value is the ID in the table for the location where the event occurred. Not all events occur at a work site. In that case the value here wiil be −1. |
| <Location_Name> | The name of the work site where the event occurred. See above <Location_ID>. |

TABLE 1-continued

XML Event Data Tags

| XML Tag | Description |
|---|---|
| <Location_Type> | If the event occurs at a work site, then this tag will contain whether it was a job, home site, etc. |
| <Mileage> | This tag contains the current mileage stored in the tracker. |
| <Map_Name> | Each user can configure a display name that is different from the actual asset name. This tag contains the preferred name to be displayed with information for this asset. |
| <Local_Event_Date_Time> | This tag contains the local time as defined by the user's account. If the user is running in Mountain Standard Time, it will be calculated as GMT-7 hours. This is used for displaying the event time. |
| <Local_Date> | This tag contains only the date in local time. |
| <Local_Time> | This tag contains the local time in 24-hour format. |
| <Local_Time_AMPM> | This tag contains the local time in 12-hour format. |
| <Local_Time> | This tag contains only the time in local time. |
| <Asset_Type> | Assets can be categorized under many different types. This is the value corresponding to the type in the database. |
| <Engineering> | All engineering data is used for debugging purposes. The engineering tags are not passed to normal Gateway customers. |

TABLE 2

XML Group Data Tags

| XML Tag | Description |
|---|---|
| <Event Group='valid'> | The child tags contain all of the information for a valid group. The attribute Group='valid' signals the XSL stylesheet that this is a complete group. |
| <Map_Name> | Each user can configure a display name that is different from the actual asset name. This tag contains the preferred name to be displayed with information for this asset. |
| <Goup_Name> | Contains the name of the group as defined by the customer for the report. |
| <Local_Event_Date_Time> | This tag contains the local time as defined by the user's account. If the user is running in Mountain Standard Time then it will be calculated as GMT-7 hours. This is used for displaying the event time. |
| <Local_Date> | This tag contains only the date in local time. |
| <Local_Time> | This tag contains the local time in 24-hour format. |
| <Local_Time_AMPM> | This tag contains the local time in 12-hour format. |
| <Total_Offset> | When a user defines a group he can configure a time offset to be added/subtracted from the group time. This gives the customer flexibility in how he manages groups he defines. |
| <Time_Difference> | The time difference between the start event and end event. |
| <Time_Diff_With_Offset> | This contains the Time_Difference with the Total Offset included. |
| <Value_Per_Hour> | When a user defines a group he can assign a dollar value to the group. This |

TABLE 2-continued

XML Group Data Tags

| XML Tag | Description |
|---|---|
| | allows enables the reports to be used for billing, calculating time sheets, etc. |
| <Value> | This is simply the Time_Difference multiplied with the Value Per Hour. |
| <Value_With_Offset> | This is simply the Time_Diff_With_Offset multiplied by the Value Per Hour. |

TABLE 3

XML Group Total Data Tags

| XML Tag | Description |
|---|---|
| <Event Group='total'> | The child tags contain all of the information for a group total. The attribute Group='total' signals the XSL style sheet that this is the tag which contains the totals for this group. |
| <Map_Name> | Each user can configure a display name that is different from the actual asset name. This tag contains the preferred name to be displayed with information for this asset. |
| <Group_Name> | Contains the name of the group as defined by the customer for the report. |
| <Local_Event_Date_Time> | This tag contains the local time as defined by the user's account. If the user is running in Mountain Standard Time then it will be calculated as GMT-7 hours. This is used for displaying the event time. |
| <Local_Date> | This tag contains only the date in local time. |
| <Local_Time> | This tag contains the local time in 24-hour format. |
| <Local_Time_AMPM> | This tag contains the local time in 12-hour format. |
| <Total_Time> | This is a summation of all the time differences for this group. |
| <Value_Per_Hour> | When a user defines a group they can assign a dollar value to the group. This allows the reports to be used for billing, calculating time sheets, etc. |

TABLE 3-continued

XML Group Total Data Tags

| XML Tag | Description |
|---|---|
| <Value> | This is simply the Total_Time multiplied with the Value Per Hour. |
| <Value_With_Offset> | This is simply the Total_Time_With_Offset multiplied with the Value Per Hour. |
| <Total_Offset> | When a user defines a group he can configure a time offset to be added/subtracted from the group time. This gives the customer flexibility in how they manage groups he defines. |
| <Total_Time_With_Offset> | The total time differences between the start event and end event plus the offset for the group. |

TABLE 4

XML Vehicle Summary Data Tags

| XML Tag | Description |
|---|---|
| <Vehicle_Summary> | The child tags contain all of the information for a vehicle summary entry. Event reports and group reports ignore this information. |
| <Map_Name> | Each user can configure a display name that is different from the actual asset name. This tag contains the preferred name to be displayed with information for this asset. |
| <Group_Name> | Contains the name of the group as defined by the customer for the report. |
| <Start_Event_Description> | This tag contains the description of the start event used for this group. |
| <End_Event_Description> | This tag contains the description of the end event used for this group. |
| <Total_Complete_Groups> | This tag contains a running total of the number of complete groups, groups with a start and end event. |
| <Total_Incomplete_Groups> | This tag contains a running total of the number of incomplete groups, groups missing either the start event or end event. |
| <Total_Groups> | This tag contains a running total of the number of incomplete and complete groups. |
| <Total_Time_Decimal> | This tag contains the total group time in decimal format. |
| <Total_Time_hhmmss> | This tag contains the total group time in HH:MM:SS format. |
| <Average_Time_Decimal> | This tag contains the average group time in decimal format. |
| <Average_Time_hhmmss> | This tag contains the average group time in HH:MM:SS format. |

TABLE 5

XML Fleet Summary Data Tags

| XML Tag | Description |
| --- | --- |
| <Fleet_Summary> | The child tags contain all of the information for a vehicle summary entry. Event reports and group reports ignore this information. |
| <Map_Name> | Each user can configure a display name that is different from the actual asset name. This tag contains the preferred name to be displayed with information for this asset. |
| <Group_Name> | Contains the name of the group as defined by the customer for the report. |
| <Start_Event_Description> | This tag contains the description of the start event used for this group. |
| <End_Event_Description> | This tag contains the description of the end event used for this group. |
| <Total_Complete_Groups> | This tag contains a running total of the number of complete groups, groups with a start and end event. |
| <Total_Incomplete_Groups> | This tag contains a running total of the number of incomplete groups, groups missing either the start event or end event. |
| <Total_Groups> | This tag contains a running total of the number of incomplete and complete groups. |
| <Vehicles_Contributing> | Fleet summaries are a combination of all the vehicle summaries. This tag contains the number of vehicles contributing events to this group. |
| <Average_Complete_Per_Vehicle> | This tag contains the number of complete groups divided by the number of vehicles contributing. |
| <Total_Time_Decimal> | This tag contains the total group time for all vehicles in decimal format. |
| <Total_Time_hhmmss> | This tag contains the total group time for all vehicles in HH:MM:SS format. |
| <Average_Time_Decimal> | This tag contains the average group time for all vehicles in decimal format. |
| <Average_Time_hhmmss> | This tag contains the average group time for all vehicles in HH:MM:SS format. |

TABLE 6

XML Vehicle Chart Data Tags

| XML Tag | Description |
| --- | --- |
| <Vehicle_Chart> | The child tags contain all of the information for a vehicle chart entry. Event reports and group reports ignore this information. |
| <Map_Name> | Each user can configure a display name that is different from the actual asset name. This tag contains the preferred name to be displayed with information for this asset. |
| <Chart_Name> | Contains the name of the chart as defined by the customer. |
| <DefaultStyle> | This tag contains the default style for a chart (i.e. pie, bar). |
| <Units> | This tag contains the units of the chart (i.e. hours, hhmmss). |
| <ShowLabels> | Indicates whether or not to show the labels of each bar or pie. |
| <ShowLegend> | Indicates whether or not to show the legend for the chart. |
| <ShowTitle> | Indicates whether or not to show the title of the chart. |
| <View3D> | Indicates whether or not to show the chart in 3D. |
| <AnimateChart> | Indicates whether to animate the chart or not. This is only valid for pie charts. |
| <Slice> | Each chart consists of a series of slices. Each slice is the data for a pie slice or a bar on the chart. There can be one or more slices for each pie. The children are listed below. |
| <Name> | This is a child tag of <Slice>. This contains the name of the group that this data represents. |
| <Data> | This is a child tag of <Slice>. This contains the actual data for the bar or pie slice. |
| <Color> | This is a child tag of <Slice>. This contains the color to display the data for the bar or pie slice. This can be configured by the user; otherwise, a default set of colors is used. |

TABLE 7

XML Fleet Chart Data Tags

| XML Tag | Description |
| --- | --- |
| <Fleet_Chart> | The child tags contain all of the information for a fleet chart entry. Event reports and group reports ignore this information. |
| <Chart_Name> | Contains the name of the chart as defined by the customer. |
| <DefaultStyle> | This tag contains the default style for a chart (i.e. pie, bar). |
| <Units> | This tag contains the units of the chart (i.e. hours, hhmmss). |
| <ShowLabels> | Indicates whether or not to show the labels of each bar or pie. |
| <ShowLegend> | Indicates whether or not to show the legend for the chart. |
| <ShowTitle> | Indicates whether or not to show the title of the chart. |
| <View3D> | Indicates whether or not to show the chart in 3D. |
| <AnimateChart> | Indicates whether to animate the chart or not. This is only valid for pie charts. |
| <Slice> | Each chart consists of a series of slices. Each slice is the data for a pie slice or a bar on the chart. There can be one or more slices for each pie. The children are listed below. |
| <Name> | This is a child tag of <Slice>. This contains the name of the group that this data represents. |
| <Data> | This is a child tag of <Slice>. This contains the actual data for the bar or pie slice. |
| <Color> | This is a child tag of <Slice>. This contains the color to display the data for the bar or pie slice. This can be configured by the user; otherwise, a default set of colors is used. |

TABLE 8

XML Trend Data Tags

| XML Tag | Description |
| --- | --- |
| <Trend> | The child tags contain all of the information for a trend entry. Event reports and group reports ignore this information. |
| <Group_Name> | Contains the name of the group as defined by the customer for the report. |
| <Asset_Type_Name> | Contains the name of the Asset Type. Trend reports are broken down by Asset Types. |
| <Data> | Each trend consists of a series of data. Each data item has many child tags as listed below. Data items are broken down by the Date in which they occur. |
| <Time_Hours_Decimal> | This is a child tag of <Data>. This contains the time in hours represented as decimal. |
| <Time_Minutes_Decimal> | This is a child tag of <Data>. This contains the time in minutes represented as decimal. |
| <Time_hhmmss> | This is a child tag of <Data>. This contains the time in hours represented as hh:mm:ss. |
| <OffsetTime_Hours_Decimal> | This is a child tag of <Data>. This contains the time with the offset in hours represented as decimal. |
| <OffsetTime_Minutes_Decimal> | This is a child tag of <Data>. This contains the time with the offset in minutes represented as decimal. |
| <OffsetTime_hhmmss> | This is a child tag of <Data>. This contains the time in hours represented as hh:mm:ss. |

APPENDIX III

EXAMPLES OF REPORTS

EXAMPLE 1

```
<hard versions"1.0">
-<ReportData>
    -<Event>
        <Event_ID>53</Event_ID>
        <Event_GMT>Thu,09 Nov 2000 17:39:27 UTC</Event_GMT>
        <description>Bed Up</description>
        <Latitude>33.3816070556641</Latitude>
        <MO_Lat>333816</MO_Lat>
        <Longitude>-111.611785888672</Longitude>
        <MO_LONG>-1116117</MO_Long>
        <Location_ID>143</Location_ID>
        <Location_Name>Fiesta Yard</Location_Name>
        <Location_Type>Home</Location_Type>
        <Mileage>2972.8</Mileage>
        <Map_Name>130</Map_Name>
        <Local_Event_Date_Time>Thu,09 Nov 2000 10:39:27 UTC</Local_Event_Date_Time>
        <Local_Date>11/09/2000</Local_Date>
        <Local_Time>10:39:27</Local_Time>
        <Local_Time_AMPM>10:39:27 AM</Local_Time_AMPM>
    -<Engineering>
        <Tracker_ID>2944</Tracker_ID>
        <Event_Packet_GMT>Thu,09 Nov 2000 17:41:32 UTC</Event_Packet_GMT>
        <Tracker_Seq_ID>109</Tracker_Seq_ID>
        <Low_Power_Mode>No</Low_Power_Mode>
        <Hex_String>090101</Hex_String>
    </Engineering>
    <Asset_Type>15</Asset_Type>
    </Event>
-<Event Groups"valid">
    <Map_Name>130</Map_Name>
    <Group_Name>Bed up/Down</Group_Name>
    <Local_Event_Date_Time>Thu,09 Nov 2000 10:39:27 UTC</Local_Event_Date_Time>
    <Local_Date>11/09/2000</Local_Date>
    <Local_Time>10:39:27</Local_Time>
    <Local_Time_AMPM>10:39:27 AM</Local_Time_AMPM>
    <Total_Offset>0</Total_Offset>
    <Time_Difference>00:00:26</Time_Difference>
    <Time_Diff_With_Offset>00:00:26</Time_Diff_With_Offset>
    <Value_Per_Hour>$0.00</Value_Per_Hour>
    <Value>$0.00</Value>
```

-continued

```
    <Value_With_Offset>$0.00</Value_With_Offset>
  <Event>
-<Event Groups"total">
    Map_Name>130<Map_Name>
    <Local_Date>11/09/2000</Local_Date>
    <Local_Time>14:30:10</Local_Time>
    <Local_Time_AMPM>02:30:10 PM</Local_Time_AMPM>
    <Group_Name>Bed up/Down</Group_Name>
    <Total_Time>00:24:23</Total_Time>
    <Value_Per_Hour>$0.00</Value_Per_Hour>
    <Value>$0.00</Value>
    <Value_With_Offset>$0.00</Value_With_Offset>
    <Total_Offset>0</Total_Offset>
    <Total_Time_With_Offset>00:24:23</Total_Time_With_Offset>
  </Event>
-<Vehicle_Summary>
    <Map_Name>130</Map_Name>
    <Group_Name>Bed up/Down</Group_Name>
    <Start_Event_Description>Bed Up</Start_Event_Description>
    <End_Event_Description>Bed Down</End_Event_Description>
    <Total_Complete_Group>6</Total_Complete_Group>
    <Total_Incomplete_Group>0</Total_Incomplete_Group>
    <Total_Groups>6</Total_Groups>
    <Total_Time_Decimal>0.406</Total_Time_Decimal>
    <Total_Time_hhmmss>00:24:23</Total_Time_hhmmss>
    <Average_Time_Decimal>0.068</Average_Time_Decimal>
    <Average_Time_hhmmss>00:04:03</Average_Time_hhmmss>
  </Vehicle_Summary>
-<Fleet_Summary>
    <Group_Name>Bed up/Down</Group_Name>
    <Start_Event_Description>Bed Up</Start_Event_Description>
    <End_Event_Description>Bed Down</End_Event_Description>
    <Total_Complete_Groups>42</Total_Complete_Groups>
    <Total_Incomplete_Groups>1</Total_Incomplete_Groups>
    <Total_Groups>43</Total_Groups>
    <Vehicles_Contributing>5</Vehicles_Contributing>
    <Average_Completes_Per_Vehicles>8.40>/Average_Completes_Per_Vehicles>
    <Total_Time_Decimal>2.128</Total_Time_Decimal>
    <Total_Time_hhmmss>02:07:40</Total_Time_hhmmss>
    <Average_Time_Decimal>0.051<Average_Time_Decimal>
    <Average_Time_hhmmss>00:03:02</Average_Time_hhmmss>
  </Fleet_Summary>
-<Report_Info>
    <Time_Zone>Mountain Time (GMT-7:00)</Time_Zone>
  </Report_Info>
</ReportData>
```

EXAMPLE 2

```
html version="1.0"?>
-<xsl:stylesheet xmlns:xst="http://www.w3.org/TR/WD-xst">
 -<xsl:script>
  -<[CDATA]
        function NevAsset (node)
        {
            NodePath = node.selectNodes ("Nap_Name"):
            ActualMode = NodePath.nextNode( );
            CurrentAsset = ActualMode.test;
            TempNode = ActualNode.parentNode.previousSibling;
            if(!TempNode)
              return CurrentAsset;
            NodePath = TempNode.selectNodes ("Nap_Name"];
            ActualNode = NodePath.nextMode( );
            PreviousAsset = ActualNode.text
            if (PreviousAsset = CurrentAsset)
              return " ";
            else
              return CurrentAsset;
        }
        function NevDate (node)
        {
            NodePath = node.selectNodes ("Local_Date"):
            ActualMode = NodePath.nextNode( );
```

-continued

```
                CurrentDate = ActualNode.test;
                TempNode = ActualNode.parentNode.previousSibling;
                if(!TempNode)
                    return CurrentDate;
                NodePath = TempNode.selectNodes ("Local_Date"];
                ActualNode = NodePath.nextMode( );
                if (!ActualNode)
                    return CurrentDate;
                PreviousDate = ActualNode.text
                if ((PreviousDate = CurrentDate) && (!NewAsset (node)))
                    return " ";
                else
                    return CurrentDate;
            }
    ]]>
   </xsl:script>
-<xsl:template matchs"/">
  <html>
  <body>
    <table border="0" width="100%">
        <!- <p><p>->
        -<tr>
        <td STYLE="font-family:Arial;font-size:9pt;color:blue">
            <br/>
            <xsl:value-of select="/ReportData/Report_Info/Time_Zone"/>
        </td>
        -<td align="right">
        <img borders"0" bordercolor="black"src="images/legend.jpg"/>
        </td>
    </tr>
   </table>
-<xsl:for-each select="/ReportData/Report_Error">
 -<xsl:if test="[Error]">
  -<p>
    -<font color="red" size="4">
        <xsi:value-of select="Error"/>
    </font>
  </p>
 </xsl:if>
 -<xsl:if test="[not (Error)]">
  -<p>
    -<font color="mediumblue" size="4">
        <xsl:value-of select="No_Events"/>
    </font>
  </p>
 </xsl:if>
 </xsl:for-each>
-<xsl:for-each select="/ReportData/Event">
 -<xsl:if tests"[not(@Group)]">
  -<xsl:if expr="NewAsset(this)1=" ">
   -<div STYLE="padding:4px;widthh:100%;font-family:Arial;font-size:10pt;color:black">
    -<strong>
        <hr/>
        <xsl:aval>NewAsset(this)</xsl:aval>
    </strong>
    </div>
  </xsl:if>
 -<xsl:if expr="(NewDate(this)1=")">
   -<div STYLE="margin-left:20px;padding:2px">
    -<span STYLE="font-family:Arial;font-size:10pt;color:blue">
        <br/>
        <xsl:aval>NewData(this)</xsl:aval>
    </span>
   </div>
  </xsl:if>
 </xsl:if>
-<xsl:if test="[@Group="valid"]">
  <table WIDTH="100%" STYLE="margin-left:40px;padding:2px">
   <tr>
    -<td WIDTH="1%">
    <img id="Blank" src="Images/blank.jpg"/>
    </td>
   -<td WIDTH="1%">
    img id="Blank" src="Images/blank.jpg"/>
   </td>
  -<WIDTH="1%">
   <img id="Blank" src="Images/blank.jpg"/>
  </td>
-<td WIDTH="12%">
```

-continued

```
-<span TITLE="Event Local Time"STYLE="font-family:Arial;font-size:10pt;color red">
    <xsl:value-of select="Local_Time_AMPM"/>
  </span>
</td>
-<td WIDTH="80%">
 -<span STYLE="font-family:Arial;font-size:10pt;color:black">
    <xsl:value-of select="Group_Name"/>
  </span>
 -<span STYLE="font-family:Arial;font-size:10pt;color:blue">
    <xsl:value-of select="Time_Difference"/>
  </span>
 -<xsl:if test="Mileage_Difference">
    <span STYLE="font-family:Arial;font-size:10pt;color:black">Mileage=</span>
   -<span STYLE="font-family:Arial;font-size:10pt;color:blue">
      <xsl:value-of select="Mileage_Difference"/>
    </span>
   </xsl:if>
  </td>
 </tr>
 </table>
</xsl:if>
->xsl:if test="[@Group="total"]>
 -<table border="0" cellpadding="3" cellspacing="0" bordercolor="black" width="100%">
  -<tr>
  -<td width="175pm" bgcolors"#FFFFCC">
    -<span STYLE="font-family:Arial;font-size:10pt;color:black">
     -<b>
       Total
       <xsl:value-of select="Group_Name"/>
      </b>
     </span>
   </td>
   -<td width="60pm" bgcolor"#FFFFCC">
    -<center>
     -<span STYLE="font-family:Arial;font-size:10pt;color:blue">
        <xsl:value-of select="Total_Time"/>
      </span>
     </center>
    </td>
   -<td bgcolors="#FFFFCC">
    -<xsl:if test="Total_Mileage">
     -<span STYLE="font-family:Arial;font-size:10pt;color:black">
       <b>Total Mileage=</b>
      </span>
     -<span STYLE="font-family:Arial;font-size:10pt;color:blue">
        <xsl:value-of select="Total_Mileage"/>
      </span>
     </xsl:if>
    </td>
   </tr>
  </table>
 </xsl:if>
</xsl:for-each>
<HR/>
<div STYLE="font-family:Arial;font-size:10pt;color:black">END OF REPORT</div>
</body>
</html>
</xsl:template>
</xsl:stylesheet>
```

EXAMPLE 3

Stylesheet for Displaying the Show Map Icon on a Report Page

```
<td WIDTH="1%">
<%'if Lat/Long, Show Map image%>
<xsl:if test="MQ_Lat">
<div>
 <xsl:attribute name="onclick">
   window.open("/../scripts/mqinterconnect.exe?screen=map&POI1lat=<xsl:value-of select="MQ_Lat"
/>&POI1lng=<xsl:value-of select="MQ_Long"/>&POI1name=<xsl:value-of select="Map_Name"
/>&POI1iconid=209&icontitles=yes&level=8",<&=chr(34)% >Map<%=chr(34)%>,<%=chr(34)%>top=180,left=20
,height=500, width=700,status=no,toolbar=no,menubar=no,location=no,titlebar=no,scrollbars=yes,resizable=yes>%=chr(34)%>)
```

-continued

```
  </xsl:attribute>
  <xsl:attribute name="title">Show Map</xsl:attribute>
  <xsl:attribute name="height">15</xsl:attribute>
  <xsl:attribute name="style">cursor:hand</xsl:attribute>
  <img src="images/showmap.jpg">
<%
 Response.Write("</img>")
 %>
</div>
</xsl:if>
<%'Blank Icon%>
<xsl:if test=".[not(MQ_Lat)]">
<div>
  <img src="images/blank.jpg">
<%
Response.Write("</img>")
%>
</div>
</xsl:if>
</td>
```

EXAMPLE 4
Stylesheet for Displaying the Vehicle Information Icon on a Report Page

```
<td WIDTH="1%">
<%Vehicle Info%>
<div>
 <xsl:attribute name="onclick">
  window.open("vehicleinfo.asp?m_MapName=<xsl:value-of select="Map_Name"/>&m_Lat=<xsl:value-of
select="Latitude"/>&m_Long=<xsl:value-of select="Longitude"/>&m_mileage=<xsl:value-of select="Mileage"
/>",<%=chr(34)%>VehicleInfo<%=chr(34)%>,<%=chr(34)%>top=180,left=630,height=200,width=330,status=no,toolbar=no,me
nubar=no,location=no.titlebar=no.scrollbars=yes.resizable=yes<%=chr(34)%>)
 </xsl:attribute>
 <xsl:attribute name="title">Vehicle Info</xsl:attribute>
 <xsl:attribute name="height">15</xsl:attribute>
 <xsl:attribute name="style">cursor:hand</xsl:attribute>
 <img src="images/vehicleinfo/jpg">
  <%
 Response.Write("</img>")
 %>
</div>
</td>
```

EXAMPLE 5
Stylesheet for Displaying the Work Site Icon on a Report Page

```
<td WIDTH="1%">
<%'Home Site/Job Site Icon%>
<xsl:if test="Location_Type">
 <xsl:choose>
    <%'Home Site Icon %>
    <xsl:when test=".[Location_Type='Home']">
    <div>
        <xsl:attribute name="title"><xsl:value-of select="Location_Name"/></xsl:attribute>
        <xsl:attribute name="height">15</xsl:attribute>
        <img src="images/home.jpg">
        <%Response.Write("</img>")%>
    </div>
    </xsl:when>
    <%'Job Site Icon %>
    <xsl:when test="[Location_Type='Job1']">
    <div>
        <xsl:attribute name="title"><xsl:value-of select="Location_Name"/></xsl:attribute>
        <xsl:attribute name="height">15</xsl:attribute>
```

-continued

```
         <img src="images/job.jpg">
         <%Response.Write("</img>")%>
      </div>
   </xsl:when>
   <%'Time Sensitive Site Icon %>
   <xsl:when test=".[Location_Type='Time Sensitive']">
      <div>
         <xsl:attribute name="title"><xsl:value-of select="Location_Name"/></xsl:attribute>
         <xsl:attribute name="height">15</xsl:attribute>
         <img src="images/time.jpg">
         <%Response.Write("</img>")%>
      </div>
   </xsl:when>
   <%'Customer Defined %>
   <xsl:when test=".[Location_Type='Customer Defined']">
      <div>
         <xsl:attribute name="title"><xsl:value-of select="Location_Name"/><xsl:attribute>
         <xsl:attribute name="height">15</xsl:attribute>
         <img src="images/job.jpg">
         <%Response.Write("</img>")%>
      <'div>
   </xsl:when>
<xsl:if test=".[not(Location_Type)]">
<div>
 <img src="images/blank.jpg">
 <%
 Response.Write("</img>")
 %>
</div>
</xsl:if>
```

What is claimed is:

1. A database reporting method that utilizes a wireless gateway for monitoring and directing the efficient usage of a fleet of vehicles of a business enterprise by respective business enterprise users of the reporting method through multiple wireless networks and the Internet using web served applications, said gateway adapted to acquire and use data related to vehicle activity, location and navigation including position, speed, direction of travel, and other specified vehicle-related events detected or determined and wirelessly reported, at least in part, by one or more vehicle-based sensors and to provide a common interface and protocol for handling said data for enabling applications that follow said protocol to interface with said gateway and to use said data to tag vehicle-related events, said gateway being further adapted for storing said tagged events and forwarding thereof in real time through the Internet to the respective business enterprise users, said method comprising:

establishing a plurality of groups of database-stored ones of said vehicle-related events according to event type, and in response to web queries by said business enterprise users, reporting to respective ones of said users on the web concerning individual vehicle or fleet efficiency matters related to said database-stored events in each of said groups relevant to respective ones of said queries.

2. The database reporting method of claim 1, wherein said reporting step comprises:

reporting to said business enterprise users values of parameters related to the database-stored events in each of said groups relevant to said respective database queries.

3. The database reporting method of claim 2, including: setting arbitrary start and end values for the database-stored events in at least some of said groups.

4. The database reporting method of claim 2, including: partitioning data in the database for faster retrieval of data for reports to the respective business enterprise users, by creating smaller database portions for search in response to said queries.

5. The database reporting method of claim 2, including: integrating web servers responsible for performing reporting functions into said gateway.

6. The database reporting method of claim 2, including: reformatting the data for display to create a new report presentation without a new query to the database.

7. The database reporting method of claim 6, including: using extensible stylesheet language (XSL) for reformatting the data for display.

8. The database reporting method of claim 1, wherein said reporting step comprises:

reporting to respective ones of said business enterprise users in response to queries therefrom on trend analysis of event data over time for selected ones of said groups.

9. The database reporting method of claim 8, including: partitioning data in the database for faster retrieval and trend analysis of data for reports to the respective business enterprise users, by creating smaller database portions for search in response to said queries.

10. The database reporting method of claim 8, including: integrating web servers responsible for trend analysis reporting functions into said gateway.

11. The database reporting method of claim 8, including: reformatting the data for display to create a new report presentation without a new query to the database.

12. The database reporting method of claim 11, including: using extensible stylesheet language (XSL) for reformatting the data for display.

13. The database reporting method of claim 1, wherein said reporting step comprises:

reporting to respective ones of said business enterprise users in response to queries therefrom on summaries of event data for selected ones of said groups.

14. The database reporting method of claim 13, including: partitioning data in the database for faster retrieval and summarizing of data for reports to the respective business enterprise users, by creating smaller database portions for search in response to said queries.

15. The database reporting method of claim 13, including:
integrating web servers responsible for data summary reporting functions into said gateway.

16. The database reporting method of claim 13, including:
reformatting the data for display to create a new report presentation without a new query to the database.

17. The database reporting method of claim 16, including:
using extensible stylesheet language (XSL) for reformatting the data for display.

18. A database reporting method that utilizes a wireless gateway for connecting remote assets of a business enterprise to business enterprise users through multiple wireless networks and the Internet using web served applications, said gateway using business logic to receive location and navigation related data including position, speed, direction of travel, and other events detected or determined by one or more sensors on each of the remote assets, said gateway providing a common interface and protocol for handling said location and navigation related data with said business logic for enabling applications that follow said protocol to interface with said gateway and to use said location and navigation related data to tag events, said gateway including a database for storing said tagged events and forwarding thereof in real time through the Internet to the respective business enterprise users, said method comprising:
establishing a plurality of groups of database-stored events related by event type or asset type, and
reporting to said business enterprise users on matters, comprising values of parameters, related to said database-stored events in each of said groups relevant to database queries by the respective business enterprise users, including establishing said parameters according to the separation of the start and end values for the database-stored events in at least some of said groups, including parameters of time and distance where at least some of said remote assets are vehicles.

19. A database reporting method that utilizes a wireless gateway for connecting remote assets of a business enterprise to business enterprise users through multiple wireless networks and the Internet using web served applications, said gateway using business logic to receive location and navigation related data including position speed, direction of travel, and other events detected or determined by one or more sensors on each of the remote assets, said gateway providing a common interface and protocol for handling said location and navigation related data with said business logic for enabling applications that follow said protocol to interface with said gateway and to use said location and navigation related data to tag events, said gateway including a database for storing said tagged events and forwarding thereof in real time through the Internet to the respective business enterprise users, said method comprising:
establishing a plurality of groups of database-stored events related by event type or asset type, and
reporting to said business enterprise users on matters related to said database-stored events in each of said groups relevant to database queries by the respective business enterprise users, said reporting step comprising:
placing logical pairings of arbitrary items of data designated by said business enterprise users into at least some of said groups, and
reporting to respective ones of said business enterprise users in response to queries therefrom, on data that relates said items.

20. The database reporting method of claim 19, including:
partitioning data in the database for faster retrieval of data for reports to the respective business enterprise users, by creating smaller database portions for search in response to said queries.

21. The database reporting method of claim 19, including:
integrating web servers responsible for performing reporting functions into said gateway.

22. The database reporting method of claim 19, including:
reformatting the data for display to create a new report presentation without a new query to the database.

23. The database reporting method of claim 22, including:
using extensible stylesheet language (XSL) for reformatting the data for display.

24. A database reporting method that utilizes a wireless gateway for connecting remote assets of a business enterprise to business enterprise users through multiple wireless networks and the Internet using web served applications, said gateway using business logic to receive location and navigation related data including position, speed, direction of travel, and other events detected or determined by one or more sensors on each of the remote assets, said gateway providing a common interface and protocol for handling said location and navigation related data with said business logic for enabling applications that follow said protocol to interface with said gateway and to use said location and navigation related data to tag events, said gateway including a database for storing said tagged events and forwarding thereof in real time through the Internet to the respective business enterprise users, said method comprising:
establishing a plurality of groups of database-stored events related by event type or asset type, and
reporting to said business enterprise users on matters related to said database-stored events in each of said groups relevant to database Queries by the respective business enterprise users, said reporting step comprises comprising reporting data derived from said database-stored events to respective business enterprise users in response to queries therefrom, in web pages with active report elements selectable to display additional information about a particular report item.

25. A database reporting method that utilizes a wireless gateway for connecting remote assets of a business enterprise to business enterprise users through multiple wireless networks and the Internet using web served applications, said gateway using business logic to receive location and navigation related data including position, speed, direction of travel, and other events detected or determined by one or more sensors on each of the remote assets, said gateway providing a common interface and protocol for handling said location and navigation related data with said business logic for enabling applications that follow said protocol to interface with said gateway and to use said location and navigation related data to tag events, said gateway including a database for storing said tagged events and forwarding thereof in real time through the Internet to the respective business enterprise users, said method comprising:
establishing a plurality of groups of database-stored events related by event type or asset type, and
reporting to said business enterprise users on matters related to said database-stored events in each of said groups relevant to database queries by the respective business enterprise users, said reporting step comprising reporting to respective ones of said business enterprise users in response to queries therefrom, on data derived from said groups of database-stored events, including automatically sorting and grouping the data to be reported by location of an asset of interest.

26. A web-based database reporting method that utilizes a wireless gateway for connecting remote assets of a business enterprise to business enterprise users on web browsers through multiple wireless networks and the Internet using web served applications, said gateway using business logic to receive location and navigation related data including position, speed, direction of travel, and other events detected or determined by one or more sensors on each of the remote assets, said gateway providing a common interface and protocol for handling said location and navigation related data with said business logic for enabling applications that follow said protocol to interface with said gateway and to use said location and navigation related data to tag events, said gateway including a database for storing said tagged events and forwarding thereof in real time through the Internet to the respective business enterprise users, said method comprising:

integrating web servers responsible for performing reporting functions into said gateway, establishing a plurality of groups of said database-stored events related by event type or asset type, reporting data derived from said database-stored events from said web servers in extensible markup language (XML) to said web browsers of respective business enterprise users in response to queries therefrom, and enabling business enterprise users to format the reported XML data in extensible stylesheet language (XSL) through respective ones of said web browsers for viewing on a web page.

27. The web-based database reporting method of claim 26, including:

setting arbitrary start and end values for the database-stored events in at least some of said groups.

28. The web-based database reporting method of claim 26, including:

establishing said parameters according to the separation of the start and end values for the database-stored events in at least some of said groups, including parameters of time and distance where at least some of said remote assets are vehicles.

29. The web-based database reporting method of claim 26, including:

partitioning data in the database for faster retrieval of data for reports to the respective business enterprise users, by creating smaller database portions for search in response to said queries.

30. A web-based database reporting method for business enterprise users in an application that uses plural groups of vehicle-related events involving activity, location and navigation of each vehicle in a fleet of vehicles including expenditure of time at or between various locations on specified tasks, wherein performance of said application is monitored by web distributed access of said business enterprise users to performance reports, said method comprising:

assigning said vehicle-related events to a plurality of groups of database-stored events related by type, utilizing at least in part, data acquired from real-time wireless reports by vehicle-based sensors, and in response to queries on web browsers by said business enterprise users, reporting to respective ones of said users on the web concerning individual vehicle or fleet performance matters related to said database-stored events in each of said groups relevant to respective ones of said queries.

31. The web-based database reporting method of claim 30, wherein said reporting step comprises:

reporting to said business enterprise users values of parameters related to the database-stored events in each of said groups relevant to respective ones of said queries.

32. The web-based database reporting method of claim 30, including:

partitioning data in the database for faster retrieval of data for reports to the respective business enterprise users, by creating smaller database portions for search in response to said queries.

33. The web-based database reporting method of claim 30, including:

reformatting the data for display to create a new report presentation without a new query to the database.

34. The web-based database reporting method of claim 33, including:

using extensible stylesheet language (XSL) for reformatting the data for display.

35. The web-based database reporting method of claim 30, wherein said reporting step comprises:

reporting to respective ones of said business enterprise users in response to queries therefrom on trend analysis of event data over time for selected ones of said groups.

36. The web-based database reporting method of claim 30, wherein said reporting step comprises:

reporting to respective ones of said business enterprise users in response to queries therefrom on summaries of event data for selected ones of said groups.

37. The web-based database reporting method of claim 30, wherein said reporting step comprises:

reporting data derived from said database-stored events to respective business enterprise users in response to queries therefrom, in web pages with active report elements selectable to display additional information about a particular report item.

38. The web-based database reporting method of claim 30, wherein said reporting step comprises:

reporting to respective ones of said business enterprise users in response to queries therefrom, on data derived from said groups of database-stored events, including automatically sorting and grouping the data to be reported by time or location of a vehicle of interest.

39. A web-based database reporting method for business enterprise users in an application that uses plural groups of events involving expenditure of time at different locations on certain tasks, wherein performance of said application is monitored by web distributed access of said business enterprise users to performance reports, said method comprising:

establishing a plurality of groups of database-stored events related by type, and reporting to said business enterprise users on the web concerning performance matters related to said database-stored events in each of said groups relevant to database queries on web browsers by the respective business enterprise users, said reporting step comprising:

placing logical pairings of arbitrary items of data designated by said business enterprise users into at least some of said groups, and reporting to respective ones of said business enterprise users in response to queries therefrom, on data that relates said items.

40. A web-based database reporting method for performance data in carrying out a web-served application of a business enterprise to business enterprise users on web browsers through multiple wireless networks and the Internet, using business logic to receive data related to actual and projected performance of said application as detected or determined by one or more performance sensors at locations where the application is being performed, and using said data to tag events of interest toward an assessment of performance, and storing said tagged events in a database for retrieval thereof in real time through the Internet by the respective business enterprise users, said method comprising:

integrating web servers responsible for performing reporting functions into a wireless network for access to the web, establishing a plurality of groups of said database-stored events related by event type, reporting data derived from said database-stored events from said web servers in extensible markup language (XML) to said web browsers of respective business enterprise users in response to queries therefrom, and enabling business enterprise users to format the reported XML data in extensible stylesheet language (XSL) through respective ones of said web browsers for viewing on a web page.

41. The web-based database reporting method of claim 40, including:

setting arbitrary start and end values for the database-stored events in at least some of said groups.

42. The web-based database reporting method of claim 40, including:

partitioning data in the database into smaller database portions for search in response to said queries, for faster retrieval of data for reports to the respective business enterprise users.

43. The web-based database reporting method of claim 40, including:

reformatting the data for display to create a new report presentation without a new query to the database.

* * * * *